United States Patent
Unger et al.

(10) Patent No.: US 11,775,481 B2
(45) Date of Patent: Oct. 3, 2023

(54) USER INTERFACES FOR MANAGING DISTRIBUTED FILE SYSTEMS

(71) Applicant: Qumulo, Inc., Seattle, WA (US)

(72) Inventors: Thomas R. Unger, Seattle, WA (US); Junjie Liang, San Francisco, CA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/491,017

(22) Filed: Sep. 30, 2021

(65) Prior Publication Data

US 2022/0100705 A1   Mar. 31, 2022

Related U.S. Application Data

(60) Provisional application No. 63/085,670, filed on Sep. 30, 2020.

(51) Int. Cl.
*G06F 16/16* (2019.01)
*G06F 16/182* (2019.01)

(52) U.S. Cl.
CPC .......... *G06F 16/168* (2019.01); *G06F 16/182* (2019.01)

(58) Field of Classification Search
CPC .............................. G06F 16/168; G06F 16/182
See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Pierre M Vital
*Assistant Examiner* — Jedidiah P Ferrer
(74) *Attorney, Agent, or Firm* — John W. Branch; Branch Partners PLLC

(57) ABSTRACT

Embodiments are directed to managing data in a file system over a network. A file system that includes objects may be provided. A capacity value of the file system may be provided based on a storage size of the objects. A threshold value may be determined based on the capacity value and a metric partition count. Traversals of the file system may determine metric partitions such that each metric partition may be associated with some objects Metrics associated with activities that are associated with the file system may be monitored. Metric partition values may be determined based on metric values associated with the metric partitions such that each metric partition value may be based on a portion of the metric values associated with a portion of the activities associated with a corresponding metric partition. Visualizations may be generated based on the metric partition values.

20 Claims, 19 Drawing Sheets

(56) References Cited

U.S. PATENT DOCUMENTS

| | | | |
|---|---|---|---|
| 5,953,719 | A | 9/1999 | Kleewein et al. |
| 6,236,996 | B1 | 5/2001 | Bapat et al. |
| 6,385,641 | B1 | 5/2002 | Jiang et al. |
| 6,415,283 | B1 | 7/2002 | Conklin |
| 6,496,944 | B1 | 12/2002 | Hsiao et al. |
| 6,529,998 | B1 | 3/2003 | Yochai et al. |
| 6,560,615 | B1 | 5/2003 | Zayas et al. |
| 6,772,435 | B1 | 8/2004 | Thexton et al. |
| 6,874,130 | B1 | 3/2005 | Baweja et al. |
| 6,892,211 | B2 | 5/2005 | Hitz et al. |
| 6,965,903 | B1 | 11/2005 | Agarwal et al. |
| 6,965,936 | B1 | 11/2005 | Wipfel et al. |
| 7,165,158 | B1 | 1/2007 | Yagawa |
| 7,213,040 | B1 | 5/2007 | Stokes et al. |
| 7,330,948 | B2 | 2/2008 | Deguchi et al. |
| 7,467,333 | B2 | 12/2008 | Keeton et al. |
| 7,594,138 | B2 | 9/2009 | Abdulvahid |
| 7,636,743 | B2 | 12/2009 | Erofeev |
| 7,693,876 | B2 | 4/2010 | Hackworth et al. |
| 7,757,056 | B1 | 7/2010 | Fair |
| 7,761,456 | B1 | 7/2010 | Cram et al. |
| 7,844,580 | B2 | 11/2010 | Srivastava et al. |
| 7,933,870 | B1 | 4/2011 | Webster |
| 7,937,421 | B2 | 5/2011 | Mikesell et al. |
| 7,958,304 | B1 | 6/2011 | Goel et al. |
| 7,962,709 | B2 | 6/2011 | Agrawal |
| 7,966,293 | B1 | 6/2011 | Owara et al. |
| 8,027,827 | B2 | 9/2011 | Bitar et al. |
| 8,046,378 | B1 | 10/2011 | Zhuge et al. |
| 8,108,429 | B2 | 1/2012 | Sim-Tang et al. |
| 8,296,312 | B1 | 10/2012 | Leung et al. |
| 8,341,540 | B1 * | 12/2012 | Haynes ............... G06F 16/168 715/772 |
| 8,355,407 | B2 | 1/2013 | Wookey et al. |
| 8,364,648 | B1 | 1/2013 | Sim-Tang |
| 8,423,733 | B1 | 4/2013 | Ozdemir |
| 8,423,821 | B1 | 4/2013 | Keith, Jr. |
| 8,448,170 | B2 | 5/2013 | Wipfel et al. |
| 8,463,825 | B1 | 6/2013 | Harty et al. |
| 8,489,656 | B2 | 7/2013 | Erofeev |
| 8,504,733 | B1 | 8/2013 | Iyer et al. |
| 8,515,911 | B1 | 8/2013 | Zhou et al. |
| 8,612,404 | B2 | 12/2013 | Bone et al. |
| 8,612,488 | B1 | 12/2013 | Subramanya et al. |
| 8,645,323 | B2 | 2/2014 | Jackiewicz et al. |
| 8,661,447 | B1 | 2/2014 | Olliff et al. |
| 8,725,691 | B1 | 5/2014 | Natanzon |
| 8,776,050 | B2 | 7/2014 | Plouffe et al. |
| 8,782,655 | B2 | 7/2014 | Blanding et al. |
| 8,806,154 | B1 | 8/2014 | Gupta et al. |
| 8,838,887 | B1 | 9/2014 | Burke et al. |
| 8,838,931 | B1 | 9/2014 | Marshak et al. |
| 8,849,764 | B1 | 9/2014 | Long et al. |
| 8,849,809 | B1 * | 9/2014 | Seshadri ............... G06F 16/345 707/725 |
| 8,868,797 | B1 | 10/2014 | Kirac et al. |
| 8,924,364 | B1 | 12/2014 | Zhong et al. |
| 8,972,694 | B2 | 3/2015 | Dolan et al. |
| 9,015,214 | B2 | 4/2015 | Nishida et al. |
| 9,026,765 | B1 | 5/2015 | Marshak et al. |
| 9,031,994 | B1 * | 5/2015 | Cao .................... G06F 16/278 707/798 |
| 9,032,170 | B2 | 5/2015 | Vaghani et al. |
| 9,047,017 | B1 | 6/2015 | Dolan et al. |
| 9,141,633 | B1 | 9/2015 | Li et al. |
| 9,143,379 | B1 | 9/2015 | Berger et al. |
| 9,158,653 | B2 | 10/2015 | Gold |
| 9,171,145 | B2 | 10/2015 | Dash et al. |
| 9,244,975 | B2 | 1/2016 | Das et al. |
| 9,244,976 | B1 | 1/2016 | Zhang et al. |
| 9,361,187 | B2 | 6/2016 | Jarvis |
| 9,384,252 | B2 | 7/2016 | Akirav et al. |
| 9,459,804 | B1 | 10/2016 | Natanzon et al. |
| 9,501,487 | B1 | 11/2016 | Yuan et al. |
| 9,547,560 | B1 | 1/2017 | Lee |
| 9,600,193 | B2 | 3/2017 | Ahrens et al. |
| 9,727,432 | B1 | 8/2017 | Cutforth et al. |
| 9,747,171 | B2 | 8/2017 | Beeken et al. |
| 9,753,782 | B2 | 9/2017 | Fang et al. |
| 9,753,932 | B1 | 9/2017 | Brow et al. |
| 9,753,987 | B1 * | 9/2017 | Dolan ............... G06F 16/24578 |
| 9,785,377 | B2 | 10/2017 | Shin et al. |
| 9,846,698 | B1 | 12/2017 | Panidis et al. |
| 10,140,185 | B1 | 11/2018 | Lopez et al. |
| 10,261,868 | B2 | 4/2019 | Brown et al. |
| 10,275,493 | B1 | 4/2019 | Mostak |
| 10,303,561 | B2 | 5/2019 | Beeken et al. |
| 10,318,401 | B2 | 6/2019 | Rothschilds et al. |
| 10,339,101 | B1 | 7/2019 | Gupta |
| 10,423,609 | B1 | 9/2019 | Strauss |
| 10,437,509 | B1 | 10/2019 | Alexeev et al. |
| 10,447,779 | B2 | 10/2019 | Dieterich et al. |
| 10,474,635 | B1 | 11/2019 | Unger et al. |
| 10,534,758 | B1 | 1/2020 | Carpenter et al. |
| 10,540,662 | B2 | 1/2020 | Barlett et al. |
| 10,545,986 | B2 * | 1/2020 | Tappan ................ G06F 16/185 |
| 10,621,057 | B2 | 4/2020 | Tripathi et al. |
| 10,621,147 | B1 | 4/2020 | Liang et al. |
| 10,664,408 | B1 | 5/2020 | Chatterjee et al. |
| 10,678,663 | B1 | 6/2020 | Sharma et al. |
| 10,725,977 | B1 | 7/2020 | Chmiel et al. |
| 10,795,796 | B1 | 10/2020 | Bai et al. |
| 10,860,546 | B2 | 12/2020 | Ye et al. |
| 11,023,535 | B1 * | 6/2021 | Greenwood ...... G06F 16/90335 |
| 11,150,823 | B2 | 10/2021 | Gao et al. |
| 11,157,458 | B1 | 10/2021 | Carter et al. |
| 11,265,262 | B1 | 3/2022 | Makie et al. |
| 11,630,832 | B2 | 4/2023 | Choi et al. |
| 2001/0039622 | A1 | 11/2001 | Hitz et al. |
| 2002/0059439 | A1 | 5/2002 | Arroyo et al. |
| 2002/0065835 | A1 | 5/2002 | Fujisaki |
| 2002/0083073 | A1 | 6/2002 | Vaidya et al. |
| 2002/0099691 | A1 | 7/2002 | Lore et al. |
| 2002/0178271 | A1 | 11/2002 | Graham et al. |
| 2003/0033308 | A1 | 2/2003 | Patel et al. |
| 2003/0145009 | A1 | 7/2003 | Forman et al. |
| 2003/0177379 | A1 | 9/2003 | Hori et al. |
| 2003/0182313 | A1 | 9/2003 | Federwisch et al. |
| 2004/0030727 | A1 | 2/2004 | Armangau et al. |
| 2004/0093474 | A1 | 5/2004 | Lin et al. |
| 2004/0098425 | A1 | 5/2004 | Wiss et al. |
| 2004/0153479 | A1 | 8/2004 | Mikesell et al. |
| 2004/0255048 | A1 | 12/2004 | Lev Ran et al. |
| 2005/0015674 | A1 | 1/2005 | Haugh |
| 2005/0027748 | A1 | 2/2005 | Kisley |
| 2005/0065986 | A1 | 3/2005 | Bixby et al. |
| 2005/0091663 | A1 | 4/2005 | Bagsby |
| 2005/0114593 | A1 | 5/2005 | Cassell et al. |
| 2005/0114726 | A1 | 5/2005 | Ouchi |
| 2005/0119996 | A1 | 6/2005 | Ohata et al. |
| 2005/0154866 | A1 | 7/2005 | Steely, Jr. et al. |
| 2005/0182992 | A1 | 8/2005 | Land et al. |
| 2005/0195660 | A1 | 9/2005 | Kavuri et al. |
| 2005/0223019 | A1 | 10/2005 | Das et al. |
| 2006/0004890 | A1 | 1/2006 | Semple et al. |
| 2006/0053139 | A1 | 3/2006 | Marzinski et al. |
| 2006/0089982 | A1 | 4/2006 | Abbott et al. |
| 2006/0090036 | A1 | 4/2006 | Zohar et al. |
| 2006/0123005 | A1 | 6/2006 | Burnett et al. |
| 2006/0173842 | A1 | 8/2006 | Horvitz et al. |
| 2006/0271604 | A1 | 11/2006 | Shoens |
| 2007/0005297 | A1 * | 1/2007 | Beresniewicz .... G05B 23/0235 702/181 |
| 2007/0011302 | A1 | 1/2007 | Groner et al. |
| 2007/0027985 | A1 | 2/2007 | Ramany et al. |
| 2007/0061783 | A1 | 3/2007 | Prakash |
| 2007/0100855 | A1 | 5/2007 | T. Kohl |
| 2007/0106706 | A1 | 5/2007 | Ahrens et al. |
| 2007/0118561 | A1 | 5/2007 | Idicula et al. |
| 2007/0143371 | A1 | 6/2007 | Kottomtharayil |
| 2008/0028006 | A1 | 1/2008 | Liu et al. |
| 2008/0059399 | A1 | 3/2008 | DeLorme et al. |
| 2008/0059541 | A1 | 3/2008 | Fachan et al. |
| 2008/0082593 | A1 | 4/2008 | Komarov et al. |

(56) References Cited

U.S. PATENT DOCUMENTS

| | | |
|---|---|---|
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1* | 8/2016 | Balimidi ............ G06F 3/0482 |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1* | 9/2017 | State ............... G06F 16/9537 |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |

(56) References Cited

U.S. PATENT DOCUMENTS

| | | | |
|---|---|---|---|
| 2018/0089031 A1 | 3/2018 | Mitkar et al. | |
| 2018/0101546 A1 | 4/2018 | Krasnow et al. | |
| 2018/0129443 A1 | 5/2018 | Karve et al. | |
| 2018/0203798 A1 | 7/2018 | Hughes et al. | |
| 2018/0276078 A1 | 9/2018 | Blea et al. | |
| 2018/0288057 A1 | 10/2018 | Varadamma et al. | |
| 2018/0314423 A1 | 11/2018 | Gong et al. | |
| 2018/0357291 A1 | 12/2018 | Choi et al. | |
| 2018/0365115 A1 | 12/2018 | Fang et al. | |
| 2019/0087770 A1* | 3/2019 | Walsh | G06F 16/244 |
| 2019/0095112 A1 | 3/2019 | Lingarajappa | |
| 2019/0102700 A1 | 4/2019 | Babu et al. | |
| 2019/0163589 A1 | 5/2019 | McBride et al. | |
| 2019/0163591 A1 | 5/2019 | Ouyang et al. | |
| 2019/0196879 A1 | 6/2019 | Dutta et al. | |
| 2019/0212921 A1 | 7/2019 | Liang et al. | |
| 2019/0220189 A1 | 7/2019 | Yang et al. | |
| 2019/0286521 A1 | 9/2019 | Okpotse et al. | |
| 2019/0286528 A1 | 9/2019 | Wu et al. | |
| 2019/0384640 A1 | 12/2019 | Swamy et al. | |
| 2020/0004977 A1 | 1/2020 | Araujo et al. | |
| 2020/0026438 A1 | 1/2020 | Peleg et al. | |
| 2020/0034077 A1 | 1/2020 | Haravu et al. | |
| 2020/0050391 A1 | 2/2020 | Meyerowitz et al. | |
| 2020/0142878 A1 | 5/2020 | Varadarajan et al. | |
| 2020/0174692 A1 | 6/2020 | Dave et al. | |
| 2020/0242075 A1 | 7/2020 | Davis et al. | |
| 2020/0286270 A1* | 9/2020 | Lymperopoulos | G06F 16/9577 |
| 2020/0341689 A1 | 10/2020 | Smith | |
| 2020/0387315 A1 | 12/2020 | Sterns et al. | |
| 2020/0409583 A1 | 12/2020 | Kusters et al. | |
| 2021/0004355 A1 | 1/2021 | Iwase | |
| 2021/0042263 A1 | 2/2021 | Zdornov et al. | |
| 2021/0042282 A1 | 2/2021 | Cseri et al. | |
| 2021/0056074 A1 | 2/2021 | Zhu | |
| 2021/0110150 A1 | 4/2021 | Kakrana et al. | |
| 2021/0117868 A1* | 4/2021 | Sriharsha | G06F 16/168 |
| 2021/0191650 A1 | 6/2021 | Vansteenkiste et al. | |
| 2021/0240393 A1 | 8/2021 | Jo et al. | |
| 2021/0240678 A1* | 8/2021 | Patel | G06F 16/278 |
| 2021/0279187 A1 | 9/2021 | Puder et al. | |
| 2021/0311841 A1 | 10/2021 | McNutt | |
| 2021/0374105 A1 | 12/2021 | Kodama et al. | |
| 2022/0019361 A1 | 1/2022 | Kurata et al. | |
| 2022/0035831 A1* | 2/2022 | Beers | G06F 16/26 |
| 2022/0058055 A1 | 2/2022 | Amemiya et al. | |
| 2022/0066882 A1 | 3/2022 | Wang et al. | |
| 2022/0091739 A1 | 3/2022 | Kumar et al. | |
| 2022/0107729 A1 | 4/2022 | Hua | |
| 2022/0124152 A1 | 4/2022 | Gallego et al. | |
| 2023/0057068 A1 | 2/2023 | Bhandarkar et al. | |
| 2023/0057600 A1 | 2/2023 | Malley et al. | |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604, dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, p;p. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.

(56) References Cited

OTHER PUBLICATIONS

Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 28, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.

(56) References Cited

OTHER PUBLICATIONS

Office Communication for U.S. Appl. No. 16/262,756 dated Aug. 24, 2020, pp. 1-7.
Office Communication for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.

(56) References Cited

OTHER PUBLICATIONS

Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 14/595,598 dated Jul. 13, 2022, pp. 1-9.
Office Communication for U.S. Appl. No. 17/062,500 dated Jul. 26, 2022, pp. 1-20.
Office Communication for U.S. Appl. No. 17/588,120 dated Jul. 27, 2022, pp. 1-34.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/203,452 dated Sep. 8, 2022, pp. 1-4.
Office Communication for U.S. Appl. No. 17/864,190 dated Sep. 19, 2022, pp. 1-10.
Office Communication for U.S. Appl. No. 17/062,500 dated Oct. 5, 2022, pp. 1-4.
Office Communication for U.S. Appl. No. 17/203,452 dated Oct. 19, 2022, pp. 1-9.
Office Communication for U.S. Appl. No. 17/588,120 dated Oct. 21, 2022, pp. 1-5.
Office Communication for U.S. Appl. No. 17/203,452 dated Nov. 9, 2022, pp. 1-2.
Office Communication for U.S. Appl. No. 17/588,895 dated Nov. 9, 2022, pp. 1-11.
Office Communication for U.S. Appl. No. 17/954,640 dated Nov. 30, 2022, pp. 1-10.
Office Communication for U.S. Appl. No. 17/115,529 dated Dec. 9, 2022, pp. 1-21.
Office Communication for U.S. Appl. No. 18/070,705 dated Feb. 23, 2023, pp. 1-14.
Office Communication for U.S. Appl. No. 17/062,500 dated Feb. 27, 2023, pp. 1-23.
Office Communication for U.S. Appl. No. 17/954,640 dated Mar. 15, 2023, pp. 1-9.
Office Communication for U.S. Appl. No. 17/864,190 dated Apr. 28, 2023, pp. 1-5.
Office Communication for U.S. Appl. No. 17/973,944 dated May 10, 2023, pp. 1-9.
Office Communication for U.S. Appl. No. 17/115,529 dated May 22, 2023, pp. 1-25.
Office Communication for U.S. Appl. No. 17/864,190 dated Jan. 24, 2023, pp. 1-12.
Office Communication for U.S. Appl. No. 17/588,120 dated Feb. 1, 2023, pp. 1-15.
Office Communication for U.S. Appl. No. 17/062,500 dated Jun. 13, 2023, pp. 1-8.
Office Communication for U.S. Appl. No. 18/070,705 dated Jun. 20, 2023, pp. 1-16.

\* cited by examiner

USER INTERFACES FOR MANAGING DISTRIBUTED FILE SYSTEMS

CROSS-REFERENCE TO RELATED APPLICATION

This application is a Utility Patent application based on previously filed U.S. Provisional Patent Application No. 63/085,670 filed on Sep. 30, 2020, the benefit of the filing date of which is hereby claimed under 35 U.S.C. § 119(e) and the contents of which is further incorporated in entirety by reference.

TECHNICAL FIELD

The present invention relates generally to file systems, and more particularly, but not exclusively, to managing user interfaces for displaying information about a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In some cases, the size or distributed nature of a modern hyper-scale file systems may make it difficult to provide users or administrators useful performance or status information that may also be understandable, intuitive, or concise. The large number of files in modern distributed file systems may make providing user interfaces for managing distributed file systems difficult because of the resources that may be required to visit the files to determine state or other information in the file system. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
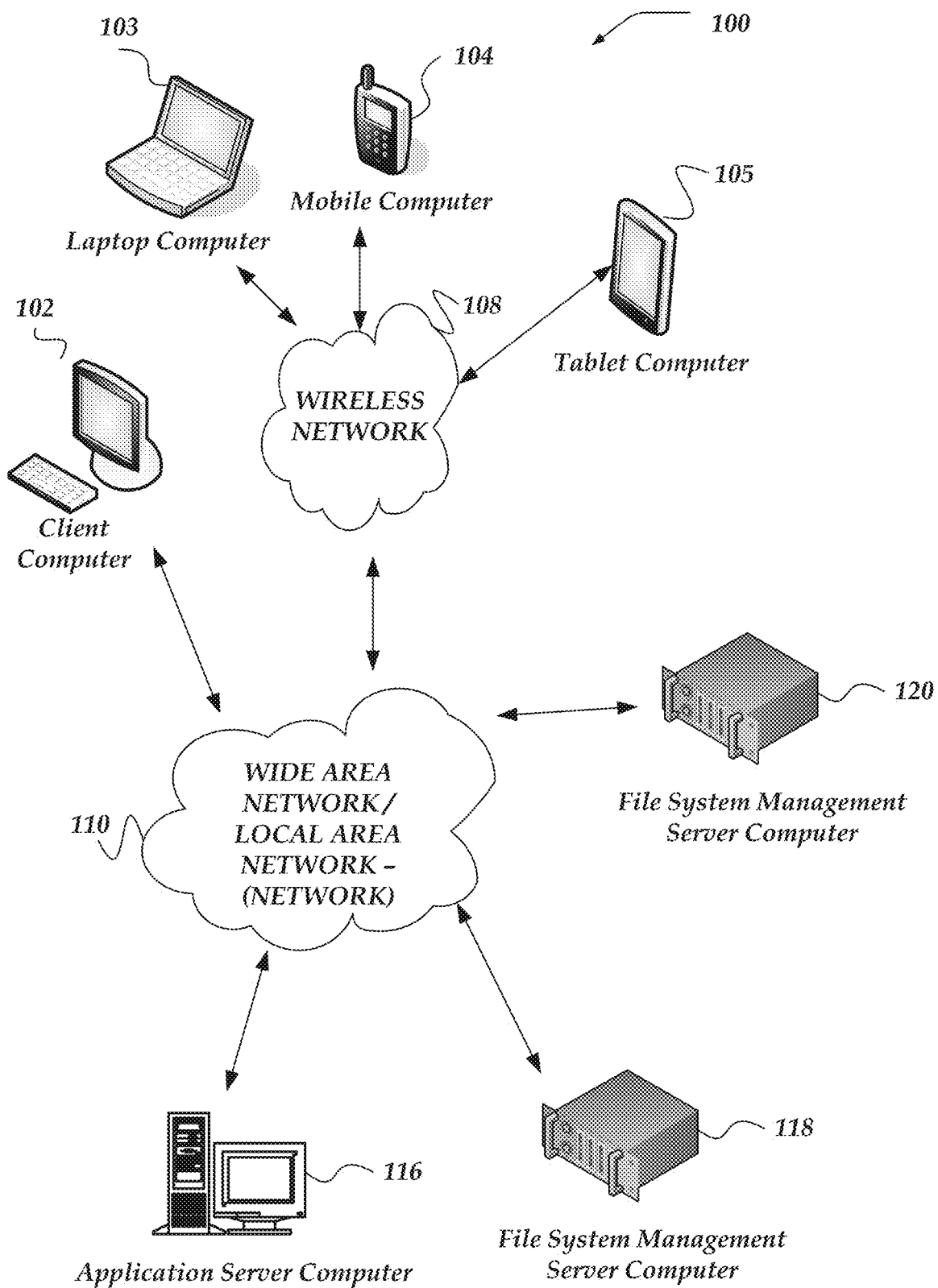
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term "panel" refers to region within a graphical user interface (GUI) that has a defined geometry (e.g., x, y, z-order) within the GUI. Panels may be arranged to display visual information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, a file system that includes a plurality of objects may be provided. In one or more of the various embodiments, a capacity value of the file system may be provided based on a storage size of the plurality objects. In one or more of the various embodiments, a threshold value may be determined based on the capacity value and a metric partition count. In one or more of the various embodiments, one or more traversals of the file system may be employed to determine a set of one or more metric partitions having a cardinality equivalent to the metric partition count such that each metric partition may be associated with one or more objects. And, in some embodiments, each metric partition may be associated with a local storage size value that is equivalent to the threshold value. In one or more of the various embodiments, one or more metrics associated with one or more activities that are associated with the file system may be monitored. In one or more of the various embodiments, one or more metric partition values may be determine based on one or more metric values associated with the one or more metric partitions such that each metric partition value may be based on a portion of the one or more metric values associated with a portion of the one or more activities that may be associated with a corresponding metric partition.

In one or more of the various embodiments, one or more visualizations may be generated based on the one or more metric partition values and the one or more metric partitions such that the one or more visualization may be displayed on a hardware display.

In one or more of the various embodiments, a real-time value of a metric for the file system may be determined. In one or more of the various embodiments, another visualization that represents the real-time value may be generated. And, in some embodiments, the one or more visualizations and the other visualization may be displayed in a same panel such that the other visualization may be overlaid on the one or more visualizations. And, in some embodiments, each visualization in the panel may be visible at the same time.

In one or more of the various embodiments, a distribution of values associated with the one or more metrics associated with the file system may be determined. In one or more of the various embodiments, a first portion of the values in the distribution that may be above an upper percentile value may be determined. In one or more of the various embodiments, a second portion of the values in the distribution that may be below of a lower percentile value may be determined. And, in some embodiments, a visualization may generated that includes one or more visual representations of the first portion of values and the second portion of values such that a remaining portion of the values in the distribution may be omitted from the visualization.

In one or more of the various embodiments, one or more legend visualizations may generated for one or more visualizations such that each legend visualization may be associated with a type of mark in the one or more visualizations. And, in some embodiments, a summary value for a metric value associated with the type of mark may be displayed within the boundary of the one or more legend visualizations.

In one or more of the various embodiments, one or more other metric partition values may be determined based on the one or more metric values and the one or more metric partitions such that the one or more other metric partition values may be determined subsequent to the one or more metric partition values. And, in some embodiments, a visualization based on a difference between the one or more other metric partition values and the one or more metric partition values may be generated.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, file system management server computer 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, file system management server computer 120, or other computers.

Client computers 102-105 may further be configured to include a client application that enables an end-user to log into an end-user account that may be managed by another computer, such as application server computer 116, file system management server computer 118, file system management server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, file system management server computer 120.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, file system management server computer 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 or file system management server computer 120 are described in more detail below in conjunction with FIG. 3. Although FIG. 1 illustrates file system management server computer 118 or file system management server computer 120, or the like, each as a single computer, the innovations or embodiments are not so limited. For example, one or more functions of file system management server computer 118 or file system management server computer 120, or the like, may be distributed across one or more distinct network computers. Moreover, in one or more embodiments, file system management server computer 118 or file system management server computer 120 may be implemented using a plurality of network computers. Further, in one or more of the various embodiments, file system management server computer 118 or file system management server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
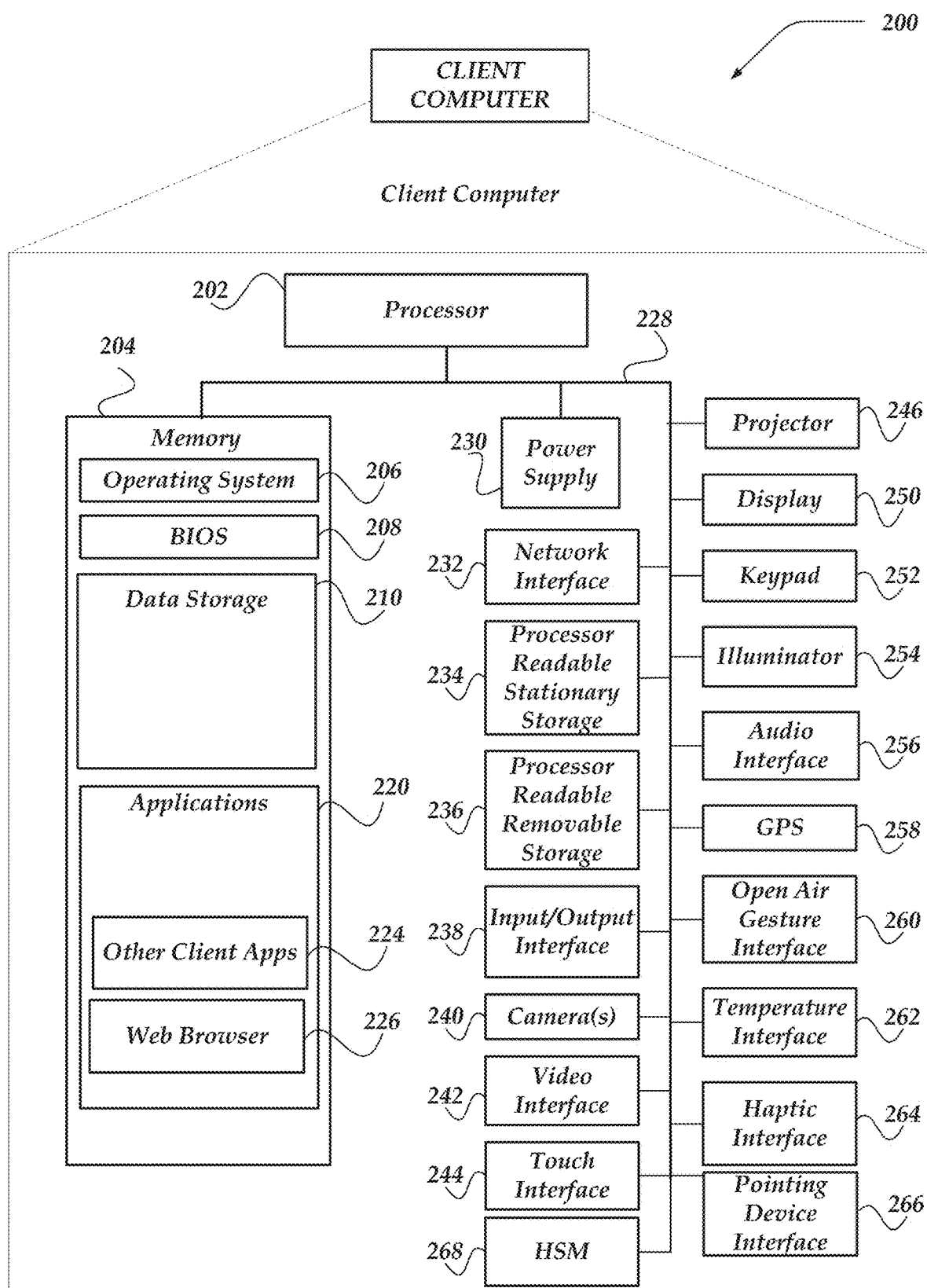
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
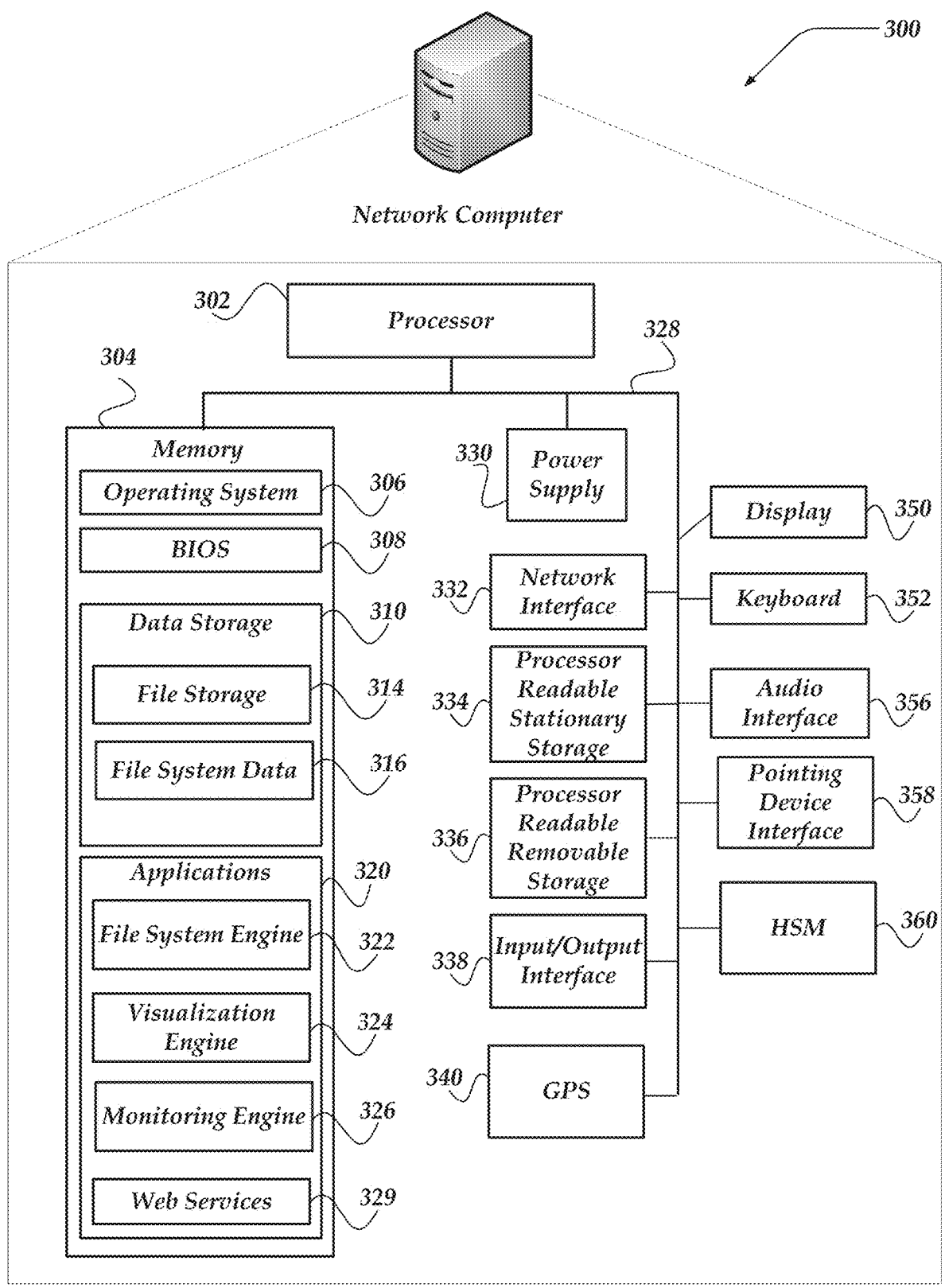
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as application server computer 116, file system management server computer 118, file system management server computer 120, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, visualization engine 324, monitoring engine 326, web services 329, or the like, may be arranged to employ geolocation information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, visualization engine 324, monitoring engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, visualization engine 324, monitoring engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, visualization engine 324, monitoring engine 326, web services 329, or the like, may be provisioned and de-commissioned automatically.

Also, in one or more of the various embodiments, file system engine 322, visualization engine 324, monitoring engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
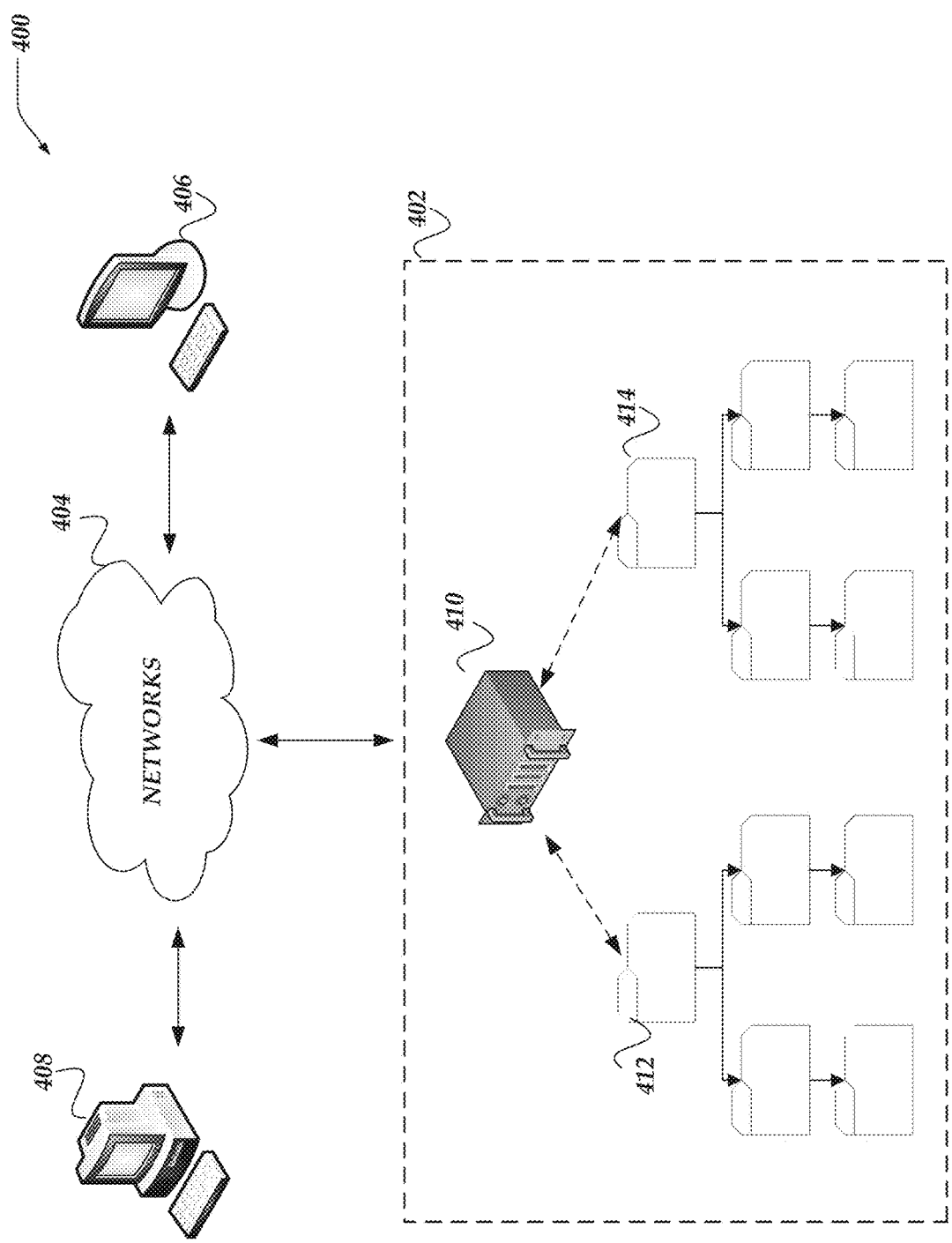
FIG. 4 illustrates a logical architecture of a system for user interfaces for managing distributed file systems in accordance with one or more of the various embodiments.

FIG. 4 illustrates a logical architecture of system 400 for user interfaces for managing distributed file systems in accordance with one or more of the various embodiments. In one or more of the various embodiments, file systems, such as, file system 402 may be arranged to be communicatively coupled to one or more networks, such as, networks 404. Accordingly, in one or more of the various embodiments, one or more clients, such as, client computer 406 and client computer 408 may be arranged to access file system 402 over networks 404. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 410. Also, in one or more of the various embodiments, file systems, such as file system 402 may include one or more file system objects, such as file system object 412 or file system object 414. file system object 412 or file system object 414 may represent the various objects or entities that may be stored in file system 402. In some embodiments, file system objects may include, files, documents, directories, folders, change records, backups, versions, branches, or the like.

In one or more of the various embodiments, the implementation details that enable file system 402 to operate may be hidden from clients, such that they may be arranged to use file system 402 the same way they use other file systems. Accordingly, in one or more of the various embodiments, clients may be unaware that they are using a distributed file system because file system engines may be arranged to mimic the interface or behavior of standard file systems.

Also, while file system 402 is illustrated as using one file system management computer with two sets of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In one or more of the various embodiments, one or more clients may be configured to be administrators that may have roles that enable a varying degree of administrative powers to administer file system objects. In one or more of the various embodiments, administrators may be enabled to established the various rule-based policies that are enforced by one or more file system engines that may be running on the one or more file system management computers.

In one or more of the various embodiments, visualization engines may be arranged to execute on one or more file system management server computers, such as, file system management server computer 410. In one or more of the various embodiments, visualization engines may be arranged to generate and manage one or more visualizations that may represent various characteristics, statuses, activities, or the like, that may be associated with a file system. In some embodiments, visualizations may be employed in various applications, such as, administrative dashboards, monitoring applications, alerts, notification reports, or the like.

In one or more of the various embodiments, the particular visualizations displayed in an application may vary depending on the file system or its applications. Similarly, in some embodiments, the particular elements of a visualization, such as, scale, units, labels, colors, type of chart or graph, or the like, may vary depending in the file system or its application. Accordingly, in some embodiments, visualization engines may be arranged to employ rules, templates, or the like, provided via configuration information to determine which visualization to display to account for local circumstances or local requirements.

Figure 5:
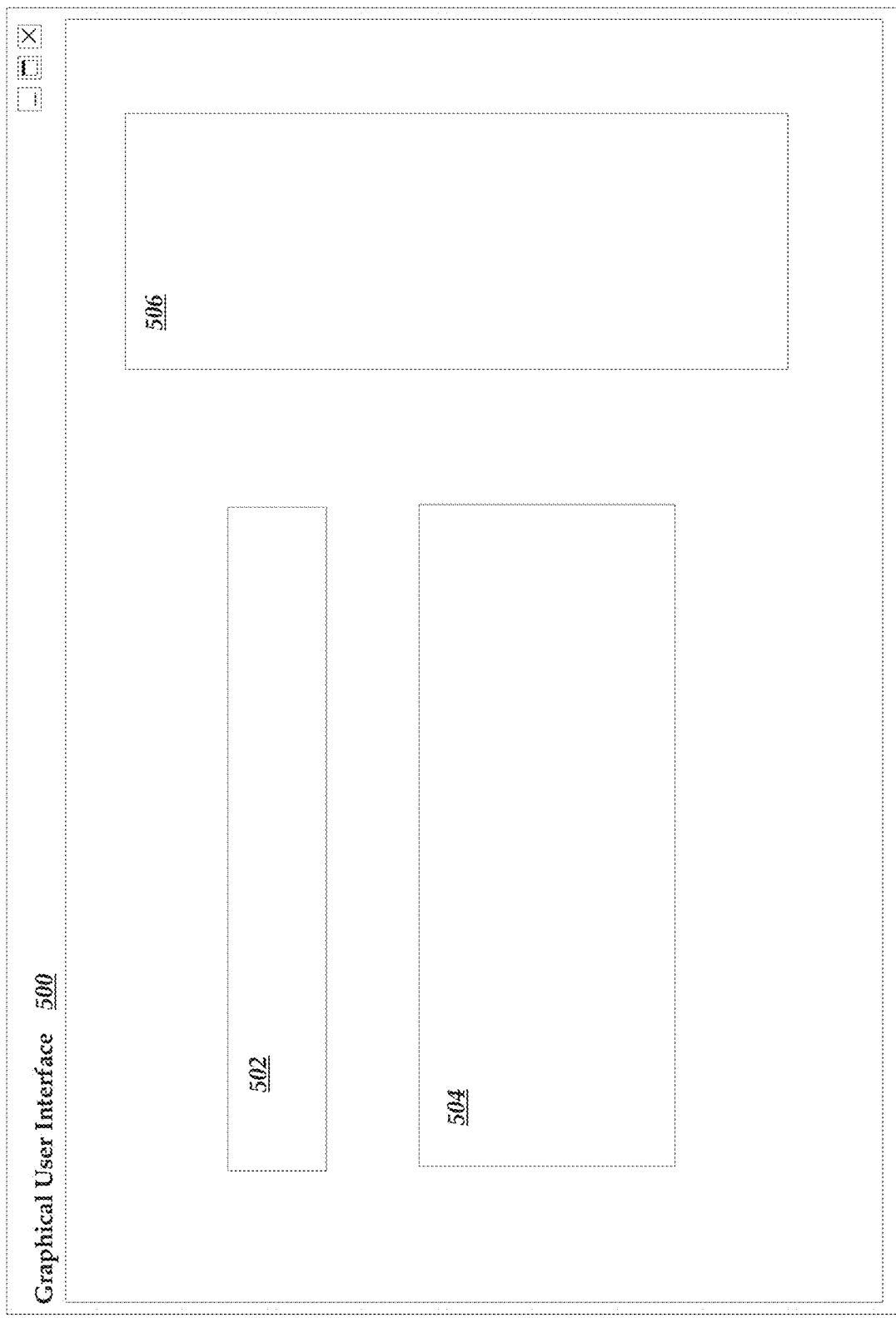
FIG. 5 illustrates a logical representation of a graphical user interface for user interfaces for managing distributed file systems in accordance with one or more of the various embodiments.

FIG. 5 illustrates a logical representation of graphical user interface 500 for user interfaces for managing distributed file systems in accordance with one or more of the various embodiments. In one or more of the various embodiments, a graphical user interface (GUI), such as, GUI 500, may be arranged to include one or more panels that may provide various features that enable user interfaces for managing distributed file systems. In some embodiments, such panels may include, various panels, such as, panel 502, panel 504, panel 506, or the like. Further, in some embodiments, one or more panels may include or be comprised of one or more other panels.

Also, in some embodiments, one or more panels may be arranged to be reactive to one or more local or remote external inputs associated with one or more file system characteristics.

Figure 6:
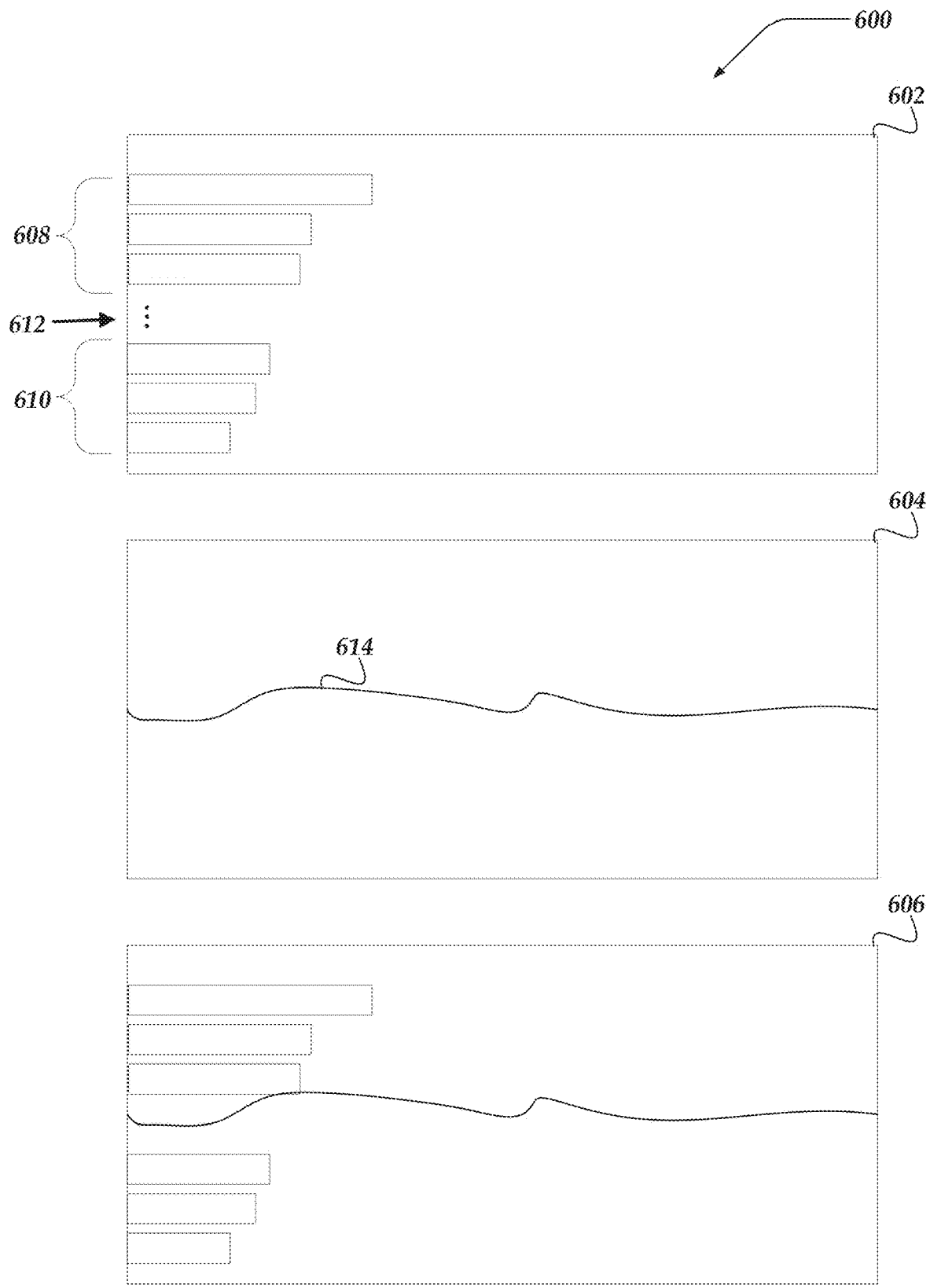
FIG. 6 illustrates a logical representation of visualizations for user interfaces for managing distributed file systems in accordance with one or more of the various embodiments.

FIG. 6 illustrates a logical representation of visualizations 600 for user interfaces for managing distributed file systems in accordance with one or more of the various embodiments. In one or more of the various embodiments, visualization engines may be arranged to generate a variety of visualizations for different file system metrics. In some embodiments, metrics may be real-time values, historical values, aggregate values, categorical values, or the like, or combination thereof.

In this example, for some embodiments, visualization 602 represents a visualization arranged to provide information associated with a file system characteristic or file system items, such as, number of connections, number of clients, bandwidth utilization, or the like, associated with various nodes, storage devices, partitions, or other items of a file system. However, in some embodiments, large file systems may include dozens, hundreds, thousands, or millions (or more) of various file system items. Accordingly, in some embodiments, employing a visualization that shows values for individual items may disadvantageously provide too much information. For example, for some embodiments, if a visualization shows individual activity metrics for 100s of concurrent clients of the file system it may be difficult for a user to discern actionable information from among the noise. Also, in some embodiments, a visualization that represents many instances of normal or average behavior/activity may result in a visualization that may be cluttered, noisy, or otherwise difficult for some users to interpret. Further, in some embodiments, such visualizations may require a display geometry that may restrict the visualizations to large display systems, thus precluding the use of smaller mobile devices.

Accordingly, in one or more of the various embodiments, visualization engines may be arranged to determine and display information associated with file system items or activities that may be outliers. In one or more of the various embodiments, visualization engines may be arranged to identify values for a given metric that may be at or above a defined upper percentile or at or below a defined lower percentile relative the distribution of metric values.

In this example, visualization items 608 represent visual information included for file system item metrics that may have values at or exceeding a defined upper percentile. Similarly, in this example, visualization items 610 represent visual information for file system item metrics that may have values at or below a defined lower percentile value.

In one or more of the various embodiments, the upper percentile value or lower percentile value may be determined or modified automatically based on the number items associated with the visualization. In some embodiments, rather than distribution percentiles, visualization engines may be arranged to select a number of top valued items or a number of least valued items, such as, the top three or bottom three. In some embodiments, the value of the percentiles, or the like, may vary depending on the display geometry of the visualization.

In one or more of the various embodiments, visualization engines may be arranged to exclude some or many item values from a visualization. In some embodiments, items associated with metrics having normal or average values may be excluded from a visualization. Accordingly, in some embodiments, the visual noise associated with many average or otherwise normal metric values may be eliminated from a visualization. In this example, for some embodiments, ellipsis, such as, ellipsis 612 may be included in a visualization to indicate that items below the upper percentile or above the lower percentile may be excluded from visualization 602.

Also, in one or more of the various embodiments, one or more visualizations may be provided to represent real-time system-wide or system-level values. For example, visual information representing the average number of connections per minute, or the like, may be displayed in real-time (or near real-time). In this example, for some embodiments, visualization 604 includes line graph 614 to represent a file system item metric value.

In some embodiments, visualization engines may be arranged to combine two or more visualizations to provide additional context for the represented metric values. In this example, for some embodiments, visualization 606 may be considered a combination of visualization 602 and visualization 604 where visualization 604 has been overlaid visualization 602. In some embodiments, this arrangement may provide additional context to both visualizations advantageously reducing the amount of display area required to convey the same visual information. In this example, visualization 606 displays the visual information of visualization 602 and visualization 604 in the space of one visualization.

Note, in some embodiments, visualizations may be arranged to represent various common, uncommon, or custom, visualization elements, such as, rows, columns, line plots, surface plots, bar charts, pie charts, tables, text fields, text areas, or the like. For brevity and clarity, examples included herein are necessarily limited. However, the described visualizations are at least sufficient to disclose the innovations described herein. Accordingly, one of ordinary skill in the art will appreciate that the innovations described herein anticipate many more different types of visualizations, metrics, file items, or the like, than those expressly included here.

Figure 7:
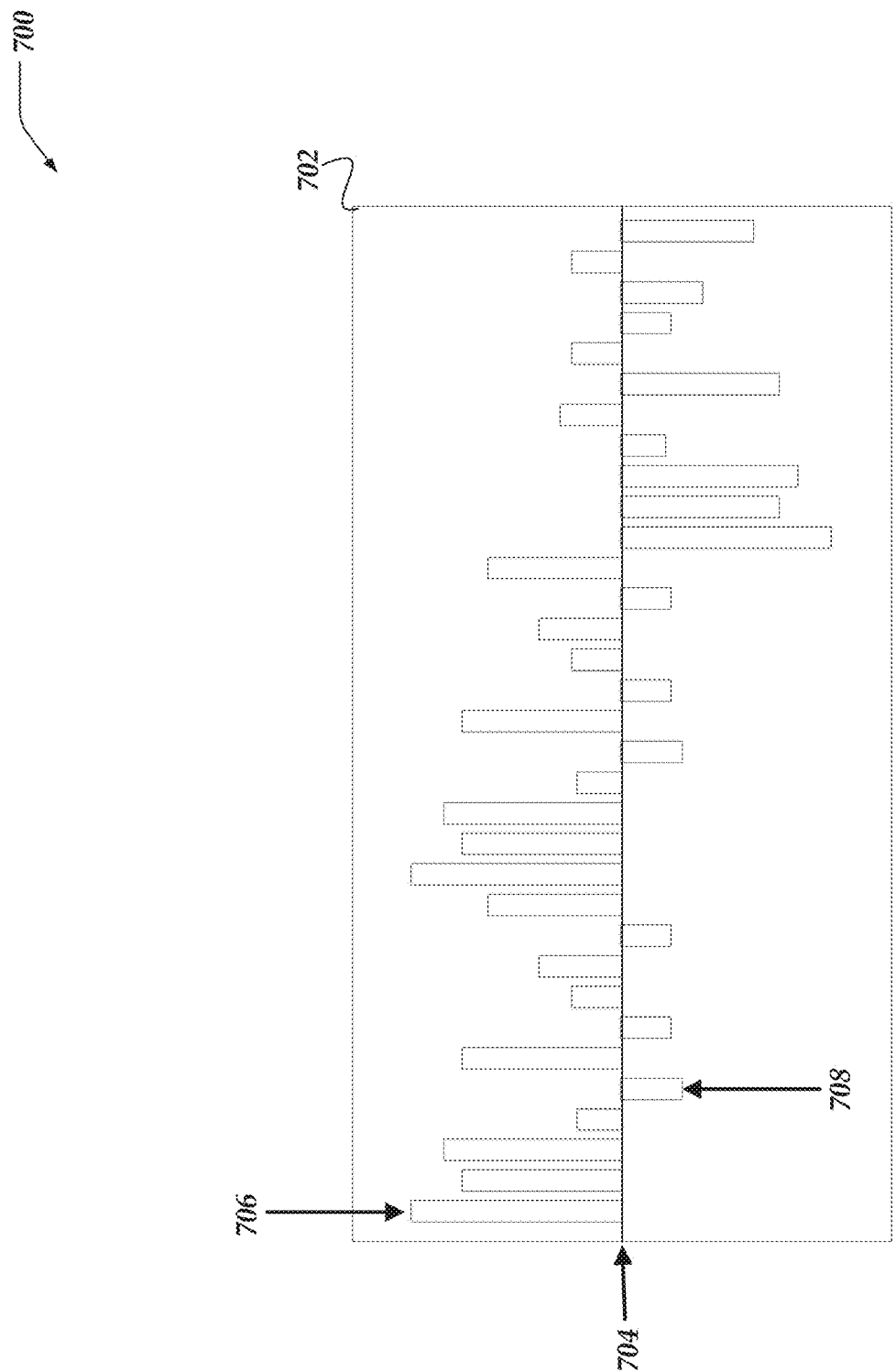
FIG. 7 illustrates a logical schematic of a visualization for user interfaces for managing distributed file systems in accordance with one or more of the various embodiments.

FIG. 7 illustrates a logical schematic of visualization 700 for user interfaces for managing distributed file systems in accordance with one or more of the various embodiments. In one or more of the various embodiments, there may be so many file system objects in a file system that determining an accurate value of various metrics associated with the file system as whole may be difficult. In some embodiments, in large file system, various aggregate metrics, such as, file size, directory size, file counts, or the like, may be maintained on the fly as individual changes (e.g., writes, reads, or the like) are made to a file system. For example, as a file is written to a file system, aggregate metrics of the parent directories associated with the file may be modified to account for the new file. Accordingly, in one or more of the various embodiments, the file system may maintain accurate aggregate metrics that may be employed to generate visualizations or reports about the file system.

In one or more of the various embodiments, each parent object in the file system tree may be arranged to locally store or reference various aggregate metrics, such as, size, access count, average age, or the like. In one or more of the various embodiments, file system engines may be arranged to employ configuration information to determine the specific aggregates that may be maintained for a file system to account for local circumstances or local requirements. For example, if a user requests the amount storage taken up by a directory in the file, the value may be immediately returned to the client without have to scan the file system.

However, in one or more of the various embodiments, it may be advantageous provide one or more visualizations that illustrate changes in aggregate values overtime. However, in some embodiments, file systems may include so many file system objects in so many directories that scanning them all to determine changes in aggregate values may be disadvantageously resource intensive. In some embodiments, traversing a file system to identify changes one or more aggregate values may take so long that a scan of aggregate values of the entire file system may be effectively meaningless or impossible. For example, in some cases, conventional scans of aggregate values may take hours or days such that for active file systems the result of such long running scans may be meaningless because of changes that occurred while the scan of aggregates is occurring.

Further, in some embodiments, if a file system has thousands or millions of directories, changes to aggregate metric values associated with a single directory may be meaningless or confusing because of the sheer number of directories in the file system. Thus, in some embodiments, a conventional visualization that attempts to represent the changes to aggregate metrics for all directories in a file system may be difficult for users to interpret.

Accordingly, in one or more of the various embodiments, visualization engines may be arranged to divide the file system into metric partitions based on the total value of the aggregate metric of interest. In one or more of the various embodiments, a visualization engine may be configured to divide the file system into metric partitions based on a defined fractional value. Thus, in some embodiments, the changes to the aggregate metric may be computed for each fractional partition of the file system. In some embodiments, visualization engines may be arranged to determine a partition size threshold based on dividing the value of the aggregate metric of interest by a defined number of metric partitions. For example, in some embodiments, a visualization engine may be arranged to employ metric partitions that are based on 1/1000 of the total value of the aggregate metric. Thus, in this example, if the total storage size (storage used) by the file system is one terabyte, each metric partition would represent one gigabyte of storage because one terabit is 1000 gigabytes. Likewise, if the total size of the file system is ten terabytes, each metric partition in this example would be ten gigabytes.

In some embodiments, visualization engines may be arranged to employ configuration information to determine a metric partition fraction or count for aggregate metrics to account for local circumstances or local requirements.

In this example, panel 702 include a visualization that may be considered to be based on metric partitions as described above. In this example, there are 33 marks each representing 1/33 of the aggregate metric value represented by the visualization. Accordingly, in this example, each mark, such as, mark 706 may represent a change the values of an aggregate metric over a given time period. In this example, mark 706 indicates that for 1/33 of the file system the metric value has increased. The amount of increase represented by mark 706 may depend on the scale of panel 702. Also, in this example, line 704 may represent zero or no change. Thus, in this example mark 708 represents that the aggregate metric value has decreased.

In one or more of the various embodiments, each metric partition may correspond to a portion of the file system that has the fractional value of the total aggregate metric of the file system. For example, if the aggregate metric is file system storage size, each mark in panel 702 represents 1/33 of the total amount of data in the file system and the file system has a total 330 terabytes of data. Thus, in this example, each mark corresponds a portion of the file system that is storing 1 terabyte of data. Note, in some embodiments, the number of directories, file system objects, nodes, or the like, represented by a metric partition may vary because the size of the individual objects may vary. For example, in some embodiments, if each metric partition represents a terabyte of data, a first metric partition may correspond to a single terabyte sized object while a second metric partition may correspond to 1000 one gigabyte objects, and so on.

Further, in some embodiments, visualization engines may be arranged to employ the metric partitions size value as a threshold value that determines the precision of visualizations of changes in aggregate metrics. In one or more of the various embodiments, visualization engines may be arranged to employ the threshold value to limit the depth of traversal in the file system.

In one or more of the various embodiments, visualization engines may be arranged to generate visualizations such as visualization 700 to enable users to click through a given metric partition mark, such as, mark 706, mark 708, or the like, to instantiate another visualization or report that shows the file system objects that comprise the metric partition. Accordingly, in some embodiments, if anomalous changes may be indicated by one or more marks in a visualization like visualization 700, a user may quickly determine the underlying file system objects that may be involved by drilling down via the one or more marks that appear anomalous.

Figure 8:
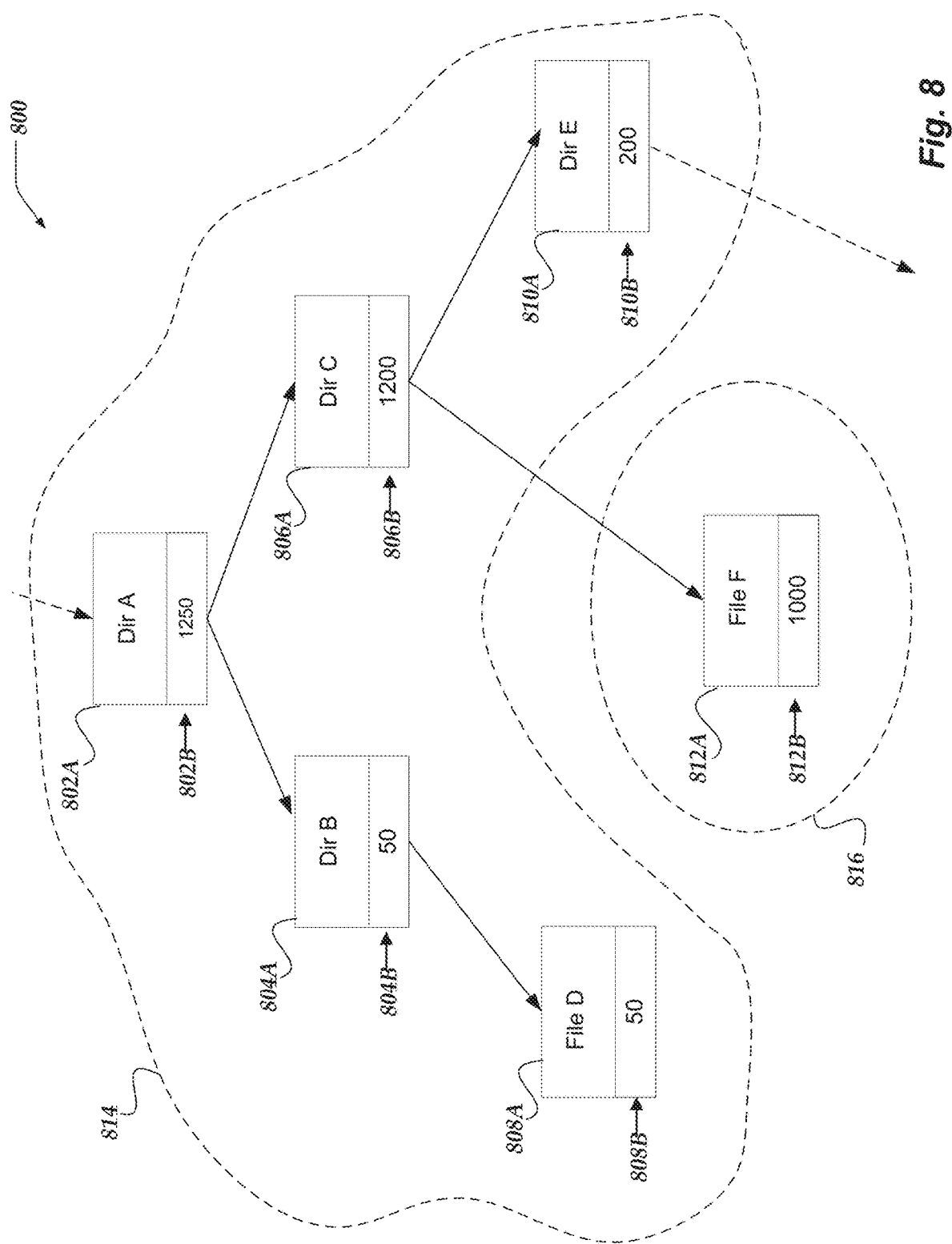
FIG. 8 illustrates a logical schematic of a file system portion for user interfaces for managing distributed file systems in accordance with one or more of the various embodiments.

FIG. 8 illustrates a logical schematic of file system portion 800 for user interfaces for managing distributed file systems in accordance with one or more of the various embodiments. As described above, in some embodiments, visualization engines may be arranged to determine a plurality of metric partitions based on a fraction of an aggregate metric value of a file system, such as storage size, file system capacity, or the like. Here, storage size refers to the amount of data actually stored in the file system where file system capacity refers to the capacity of a file system irrespective of the data currently stored in the file system.

In one or more of the various embodiments, visualization engines may be arranged to execute one or more descent traversals of a file system tree to identify sub-trees that represent the file system objects that may be associated metric partitions. Accordingly, in some embodiments, each determined sub-tree may have a local aggregate metric value approximately equivalent to a fractional value of the aggregate metric of interest where the fraction may be determined based on defined number of metric partitions. For example, for some embodiments, if a visualization engine may be configured to generate 1000 metric partitions based on file system storage size, each metric partition may be associated with one or more file system sub-trees that have local storage size values that add up to 1/1000th of the total storage size of the file system.

In this example, for some embodiments, file system portion 800 includes some directories (e.g., parent objects) and some files (non-parent file system objects). Also, in one or more of the various embodiments, each parent object in file system portion 800 may be associated with meta-data that includes one or more aggregate metric values. And, in this example, each file object may be associated with meta-data that includes a metric value the contributes to the value of the aggregate metric value of its parent object. For example, in this example, file object 808A (File D) is associated with meta-data 808B that stores a metric value of 50 (e.g., file size). And, because in this example, file object 808A is the only child object of parent object 804A, meta-data 804B stores an aggregate metric value of 50—based on the aggregation of all the child objects underneath it. In this case, parent object 804A only has one child, so its aggregate metric value is the same as its one child.

In contrast, parent object 802A is associated with meta-data 802B that stores an aggregate metric value of 1250 representing the aggregation of the aggregate metric for all of the child objects under parent object 802A.

For this example, the aggregate metric stored in the meta-data may be assumed to be storage size in megabytes (e.g., file size) and the fractional threshold value for each metric partition may be assumed to be 1000 megabytes (one gigabyte). Accordingly, in some embodiments, visualization engines may be arranged to determine the metric partitions for a file system portion, such as, file system portion 800 by starting a descent traversal at parent object 802A. Accordingly, at parent object 802A, the visualization engine may be arranged to inspect the aggregate metric value associated with parent object 802A, which, in this example may be 1250. In this example, 1250 exceeds the maximum size of a metric partition (1000 in this example). Accordingly, the visualization engine may be arranged to continue its descent traversal of the file system.

Accordingly, in this example, the visualization engine may visit object 804A. Object 804A is associated with meta-data 804B that indicates that the aggregate size of the child objects of parent object 804A may be 50. In this example, 50 is less than the metric partition size (e.g., 1000) so the visualization engine may stop its descent because it is now known that there may be no objects below parent object 804A that would cause it exceeds the metric partition size.

In contrast, in this example, if the visualization engine visits object 806A meta-data 806B has aggregate metric value of 1200. In this example, 1200 is larger than the metric partition limit of 1000 so the descent traversal may continue. Accordingly, the visualization engine may next visit object 810A where meta-data 810B has an aggregate metric value of 200. Here, 200 is less than 1000, so the visualization engine may stop the descent traversal because now it is known that everything below object 810A has a size of 200 or less.

However, in this example, if the visualization engine visits object 812A, meta-data 812B shows its aggregate metric value is 1000. In this example, since object 812A is a leaf of the tree, the descent traversal has to stop.

Next, in this example, the visualization engine may backup to object 806A, subtracting the aggregate metric value associated with object 812A from the aggregate metric value associated with object 806A. In this case, because aggregate metric value of 812A subtracted from its parent object (object 806A) is less than the metric partition size limit, the traversal of file system portion 800 may be considered complete with two metric partitions determined. Accordingly, in this example, metric partition 814 may include object 802A, object 804A, object 808A, object 806A, and object 918E while metric partition 816 may include object 812A. Note, in this some cases, metric partition 814 may include additional upstream objects not shown in this simplified example.

Accordingly, in one or more of the various embodiments, visualization engines may be arranged to begin at the root object of a file system and perform a descent traversal until each object in the file system is associated with a metric partition. However, in some embodiments, because the metric partition size limit is also the minimum threshold that ends a descent down a tree branch many traversal steps may be eliminated.

In one or more of the various embodiments, visualization engines may be arranged to employ the metric partitions to rapidly determine changes in aggregate metrics by limiting its scan of file system objects to the roots of the sub-trees comprising the metric partitions. For example, in this example, the initial aggregate metric value for metric partition 814 may be 200. Thus, in this example, if a file having a size of 50 GB is added as a child to object 804A, metric partition 802A may aggregate metric value may be arranged to be increased by 50 GB.

Generalized Operations

FIGS. 9-12 represent generalized operations for user interfaces for managing distributed file systems in accordance with one or more of the various embodiments. In one or more of the various embodiments, processes 900, 1000, 1100, and 1200 described in conjunction with FIGS. 9-12 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-12 may perform actions for user interfaces for managing distributed file systems during replication jobs in accordance with at least one of the various embodiments or architectures such as those described in conjunction with FIGS. 4-8. Further, in one or more of the various embodiments, some or all of the actions performed by processes 900, 1000, 1100, and 1200 may be executed in part by file system engine 322, visualization engine 324, monitoring engine 326, or the like.

Figure 9:
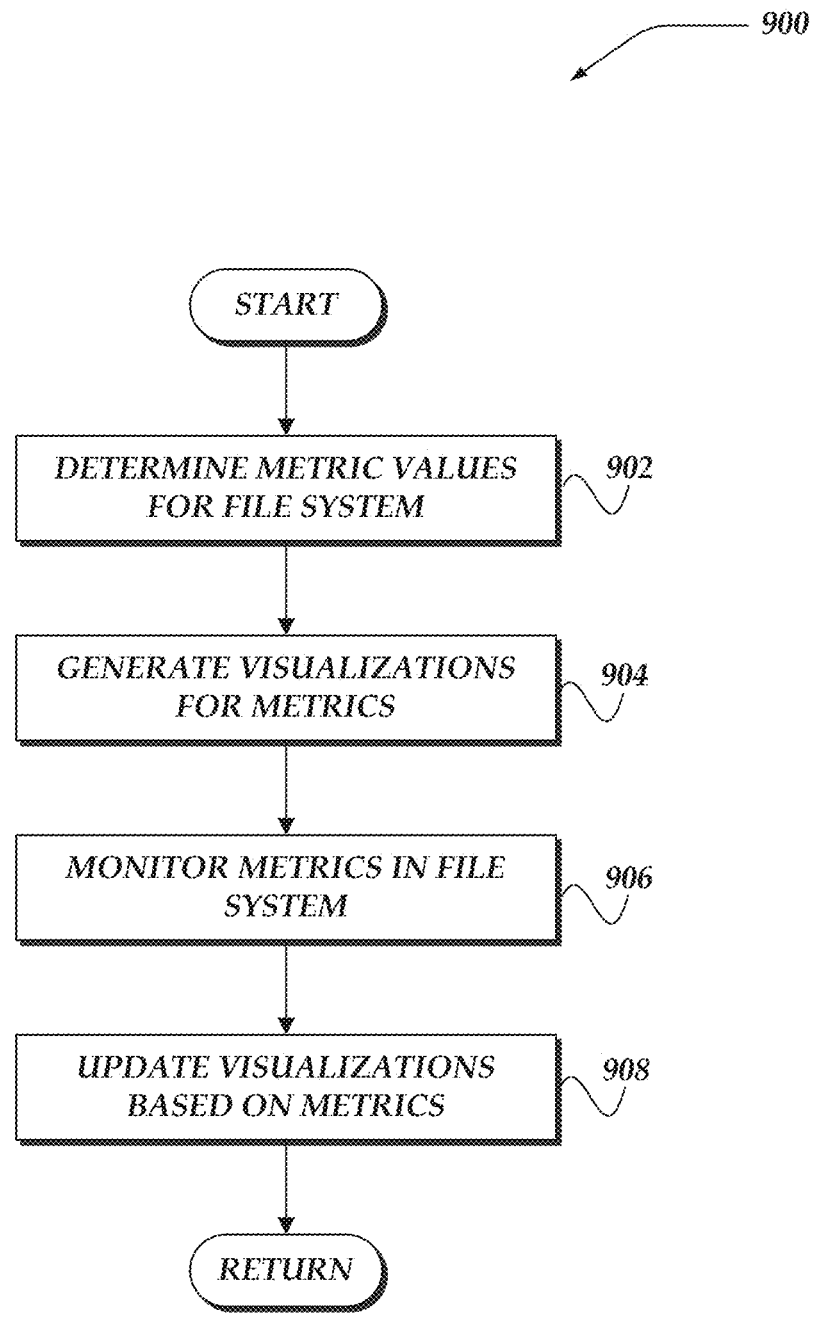
FIG. 9 illustrates an overview flowchart for a process for user interfaces for managing distributed file systems in accordance with one or more of the various embodiments.

FIG. 9 illustrates an overview flowchart for process 900 for user interfaces for managing distributed file systems in accordance with one or more of the various embodiments. After a start block, at block 902, in one or more of the various embodiments, a visualization engine may be arranged to determine one or more metric values for a file system. In one or more of the various embodiments, visualization engines may be arranged to collect one or more metrics values directly. Also, in some embodiments, monitoring engines may be arranged to collect metric values that may be provided to a visualization engine. In some embodiments, visualization engines may be arranged to subscribe to one or more of the file system engines, monitoring engines, one or more external monitoring services, or the like, to receive values or information associated with one or more metrics.

At block 904, in one or more of the various embodiments, the visualization engine may be arranged to generate one or more visualizations based on the one or more metrics. In one or more of the various embodiments, visualization engines may generate a variety of different visualization for different views, users, applications, interactions reports, or the like. In one or more of the various embodiments, visualization engines may be arranged to determine the particular visualizations based on configuration information to account for local circumstances or local requirements.

At block 906, in one or more of the various embodiments, the visualization engine may be arranged to monitor the one or more metrics in the file system. In one or more of the various embodiments, visualization engines may be arranged to collect updates to one or more metrics values directly. Also, in some embodiments, monitoring engines may be arranged to collect updated metric values that may be provided to a visualization engine. In some embodiments, visualization engines may be arranged to subscribe to one or more of the file system engines, monitoring engines, one or more external monitoring services, or the like, to receive values or information associated with one or more metrics.

Accordingly, in some embodiments, visualization engines may be arranged to collect real-time or near real-time updates for one or more of the metrics.

At block 908, in one or more of the various embodiments, the visualization engine may be arranged to update the one or more visualizations based on the update metric values. In one or more of the various embodiments, one or more of the visualizations may be arranged or designed to react to real-time or near real-time updates to the metrics represented by the visualization.

Next, in one or more of the various embodiments, control may be returned to a calling process.

Figure 10:
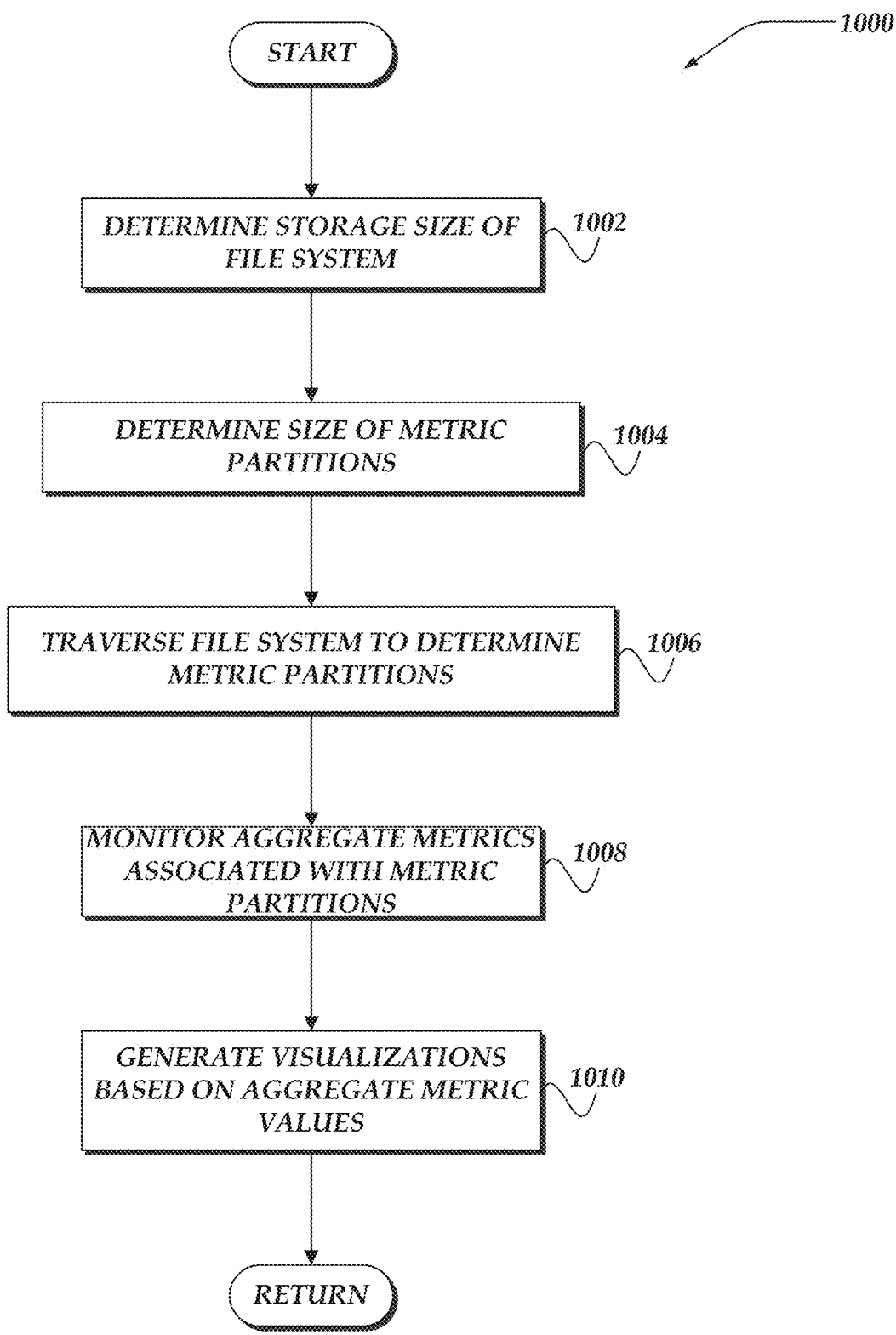
FIG. 10 illustrates a flowchart for a process for determining partition based visualization for user interfaces for managing distributed file systems in accordance with one or more of the various embodiments.

FIG. 10 illustrates a flowchart for process 1000 for determining a partition based visualization for user interfaces for managing distributed file systems in accordance with one or more of the various embodiments. After a start block, at block 1002, in one or more of the various embodiments, the visualization engine may be arranged to determine a storage size value that may be associated with file system. In some embodiments, visualization engines may be arranged to determine the current storage size based on information provided or maintained by the file system engine. For example, in some embodiments, the file system engine may be arranged to maintain a running count of the amount of data stored in the file system. In some embodiments, the storage size may be provided in terms of bytes, gigabytes, terabytes, or the like. In other embodiment, the storage size may be based on storage device blocks, storage devices, or the like. In some embodiments, the storage size may be based on number of objects.

Also, in one or more of the various embodiments, visualization engines to employ other file system-wide metrics values besides storage size. Accordingly, in some embodiments, visualization engines may be arranged to employ rules, instructions, or the like provided via configuration information to determine the particular metric to use as base value for partitioning the file system.

At block 1004, in one or more of the various embodiments, the visualization engine may be arranged to determine the size of metric partitions. In some embodiments, metric partitions may be sized based on fraction of the base metric. For example, in some embodiments, if a file system may be configured to have 1000 metric partitions, each partition may be sized based on $1/1000$ of the base value. Thus, in some embodiments, if the base value is storage size, the partition will be sized based on a fraction of the storage size.

In some embodiments, visualization engines may be arranged to generate a fixed size of metric partitions. For example, if the number of partitions is defined to be 1000, each partition may be sized based on dividing the base value by 1000. Also, in some embodiments, visualization engines may be configured to define a maximum or minimum partition size.

At block 1006, in one or more of the various embodiments, the visualization engine may be arranged to traverse the file system to determine the metric partitions. In one or more of the various embodiments, visualization engines may be arranged to traverse the file system to determine file system objects to divide into metric partitions. Accordingly, in some embodiments, visualization engines may be arranged to identify one or more sub-trees in the file system that may be grouped into metric partitions. For example, in some embodiments, if the metric partition size may be 100 GB, one or more sub-tree in the file system up to about a size of 100 GB may be grouped into metric partitions. In some cases, for some embodiments, one or more metric partitions may be over-sized or under-sized depending on how the object in a file system may be arranged. However, in one or more of the various embodiments, every file system object in the file system may be associated with a metric partition. In some embodiments, the strategy for determining under-sized or over-sized metric partitions may vary depending on the characteristics of the file system or local circumstances or local requirements as determined via configuration information.

At block 1008, in one or more of the various embodiments, the visualization engine may be arranged to monitor one or more aggregate metrics for each metric partition. In one or more of the various embodiments, metric partitions enable visualization engines to monitor one or more aggregate metrics associated with the sub-trees that comprise the metric partitions.

At block 1010, in one or more of the various embodiments, the visualization engine may be arranged to generate a visualization based on the aggregate metric values associated with the metric partitions. In one or more of the various embodiments, metric partitions enable the generation of various visualizations that may be based on metrics associated with partitions. Accordingly, in one or more of the various embodiments, visualizations may be designed to effectively present visual information for a known number of metric partitions. For example, in some embodiments, absent metric partitions the number of sub-trees or parent objects may be practically unbounded. Accordingly, for this example, designing effective visualizations may be difficult because the number of items in the visualization may be difficult to anticipate. In contrast, in one or more of the various embodiments, if the number of metric partitions may be known to be relatively constant, effective consistent visualizations may be designed and displayed. Because, in some embodiments, even the number of objects associated with a metric partition may vary, the number of metric partitions may remain consistent.

Further, in one or more of the various embodiments, metric partitions may enable visualizations that show how metrics associated with metric partitions has changed in reasonable time period. For example, visualization engines may be arranged to rapidly update a visualization based on 1000 metric partitions rather than visualizations based on 1,000,000,000 smaller objects that each would have to be visited to determine relative changes in values.

Next, in one or more of the various embodiments, control may be returned to a calling process.

Figure 11:
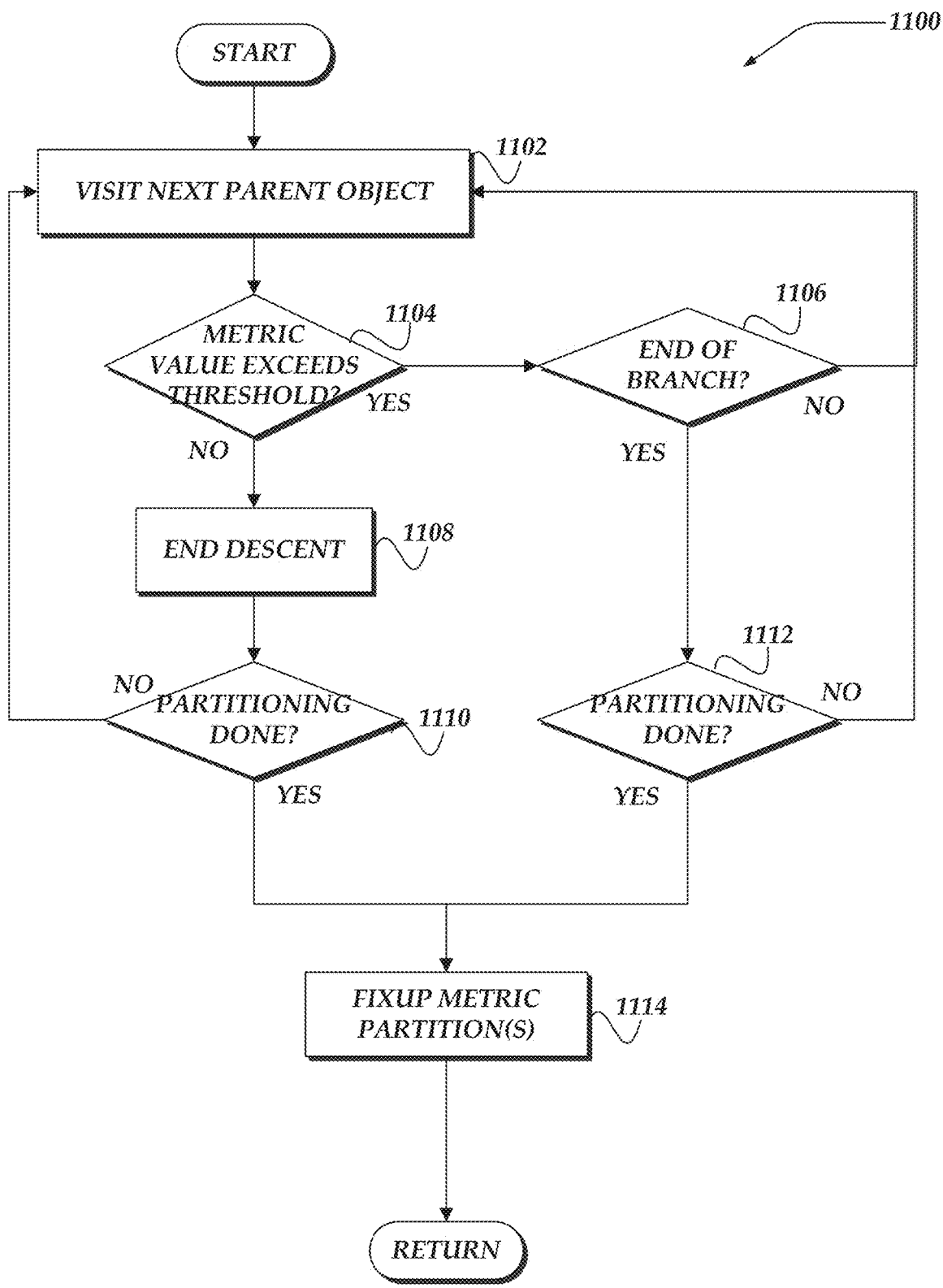
FIG. 11 illustrates a flowchart for a process for associating file system objects with metric partitions for user interfaces for managing distributed file systems in accordance with one or more of the various embodiments.

FIG. 11 illustrates a flowchart for process 1000 for associating file system objects with metric partitions for user interfaces for managing distributed file systems in accordance with one or more of the various embodiments. After a start block, at block 1102, in one or more of the various embodiments, the visualization engine may be arranged to visit the next parent object in a file system. In one or more of the various embodiments, initially, the visualization engines may be arranged to start with the root object of the file system.

In one or more of the various embodiments, visualization engines may be arranged to traverse down one or more branches of the file system. Accordingly, in one or more of the various embodiments, one or more parent objects (e.g., directory objects) may be visited during the traversals.

Accordingly, in some embodiments, visualization engines may be arranged to visit each parent object that is associated with an aggregate size value that equals or exceed the threshold value.

At decision block 1104, in one or more of the various embodiments, if the aggregate metric value associated with the visited parent object matches or exceeds the threshold value, control may flow to decision block 1106; otherwise, control may flow to block 1108.

In one or more of the various embodiments, as described above, the number of metric partitions being generated and the storage size or capacity of a file system may determine the threshold value that may determine which objects may be associated with a metric partition.

Accordingly, in one or more of the various embodiments, visualization engines may be arranged to compare the local aggregate storage size associated with the visited parent object to determine if the sub-tree under the parent object can fit with the size limit for metric partitions.

At decision block 1106, in one or more of the various embodiments, if an end of a branch in the file system may be reached, control may flow to decision block 1112; otherwise, control may loop back to block 1102.

In one or more of the various embodiments, in some cases, a traversal may reach the end of a branch in file system. Thus, in some embodiments, even though the current parent object may be associated with a local storage size that exceeds the threshold value there may be no more parent objects below it. Accordingly, in some embodiments, the visualization engine may be arranged to end the traversal of the branch.

At block 1108, in one or more of the various embodiments, the visualization engine may be arranged to end the descent of the current branch of the file system. In one or more of the various embodiments, if the visited parent object is associated with a local storage size value that may be less than the threshold value, there is no need to continue traversing down this branch of the file system because the entire sub-tree of file system below this position may fit in a metric partition. Accordingly, in one or more of the various embodiments, depending on the value of the threshold value, performance of the traversal may be improved by excluding the many objects that may be below the threshold.

In one or more of the various embodiments, visualization engines may be arranged to automatically stop the traversal of a branch of sub-tree at the visited parent object associated with a storage size that may be less than the threshold value.

At decision block 1110, in one or more of the various embodiments, if the partitioning of the file system may be finished, control may flow to block 1114; otherwise, control may loop back to block 1102. In one or more of the various embodiments, after the traversal of one sub-tree has finished there may be one or more remaining sub-trees in the file system to evaluate. Accordingly, in one or more of the various embodiments, if so, the visualization engines may be arranged to back up until to another sub-tree root (e.g., another parent object) to begin a traversal of another sub-tree.

Note, in some embodiments, one or more visualization engines (or process, threads, or the like, associated with one visualization engine) may traverse different portions of the file system in parallel or otherwise concurrently. Accordingly, one of ordinary skill in the art will appreciated that in some embodiments, more than one sub-tree of the file system may be traversed or otherwise evaluated concurrently. In some embodiments, portions of the file system may be located or managed by separate storage computers that may be employed separate visualization engines to determine one or more metric partitions by traversing one or more portions of the file system.

At decision block 1112, in one or more of the various embodiments, if the partitioning of the file system may be finished, control may flow to block 1114; otherwise, control may loop back to block 1102. This decision block may be considered similar to decision block 1112. Accordingly, in some embodiments, the visualization engine may be arranged to continue traversing other branches of the file system to determine metric partitions.

At block 1114, in one or more of the various embodiments, the visualization engines may be arranged to fix up one or more metric partitions.

In one or more of the various embodiments, visualization engines may be arranged to perform one or more actions to adjust one or more metric partitions to improve the balance of objects. In one or more of the various embodiments, the last parent object in a file system branch may be associated with storage size value that exceeds the threshold value. Accordingly, in some embodiments, the visualization engines may be arranged to evaluate the size of the child objects of such parent objects. In some embodiments, these file system objects may be files rather than directories.

Accordingly, in one or more of the various embodiments, visualization engines may be arranged to evaluate the storage size value for the individual file system objects associated with parent object to attempt to balance them into one or more metric partitions. In one or more of the various embodiments, the particular balance strategy may vary depending on the number of object or the size of objects. For example, for some embodiments, if the child objects associated with a parent object are about the same size, the visualization engines may be arranged to associate half of the object into on metric partition and the other half in another. Likewise, in some embodiments, if there are a few large objects and many small objects, the visualization engines may be arranged to associate the small objects with the larger objects in one or more metric partitions.

Also, in some embodiments, visualization engines may be arranged to employ a 'rounding' strategy that determines if the child objects of an over-sized branch ending parent object are divided or distributed into two or more metric partitions or all held in one over-sized metric partition. For example, for some embodiments, if the threshold value may be 10 GB, and the end branch parent object has a storage size of 12 GB, the visualization engines may be arranged to resolve the over-sized sub-tree by automatically creating an over-sized metric partition. In contrast, for example, if the storage size of the parent object of the over-sized sub tree may be 20 GB, the visualization engine may be arranged to attempt to split the parent object's child objects into more than on metric partition.

In one or more of the various embodiments, visualization engines may be arranged to employ rules, instructions, or the like, provided via configuration information to determine how over-sized or under-sized sub-trees may be fit into metric partitions.

Further, in some embodiments, visualization engines may be arranged to perform more general optimizations that may move some objects from over-filler metric partitions into under filled partitions if any.

Also, in one or more of the various embodiments, visualization engines may be arranged to perform other fix-up actions that may attempt rules that may balance metric partition membership of objects based on various criteria.

In some embodiments, visualization engines may be arranged to modify metric partition membership based on the physical location of objects such that one or more objects may be reassigned to different metric partitions to be associated with other objects on the same storage device, storage computer, cluster, or the like.

Also, in some embodiments, visualization engines may be arranged to group objects in metric partition based on usage characteristics, such as, recency, read/write average size, read/writes per time, type of application accessing or generating the objects, roles of users accessing the objects, or the like.

Also, in some embodiments, visualization engines may be arranged to adjust metric partition membership based on storage device or storage computer characteristics that store objects. Accordingly, in one or more of the various embodiments, visualization engines to employ rules, instructions, or the like, provided via configuration information to determine how to adjust or balance one or more metric partitions.

Next, in one or more of the various embodiments, control may be returned to a calling process.

Figure 12:
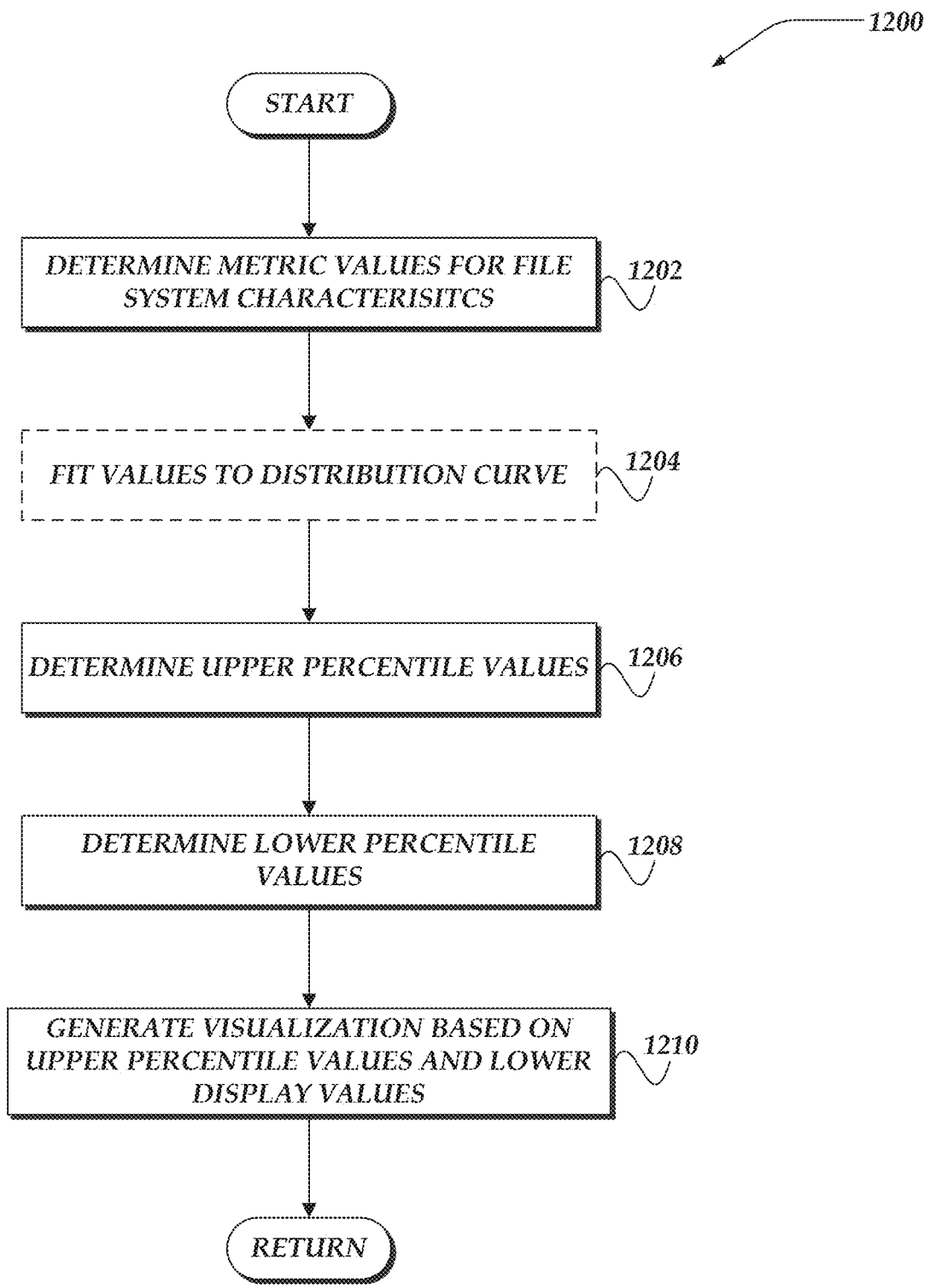
FIG. 12 illustrates a flowchart for a process for user interfaces for managing distributed file systems in accordance with one or more of the various embodiments.

FIG. 12 illustrates a flowchart for process 1200 for user interfaces for managing distributed file systems in accordance with one or more of the various embodiments. After a start block, at block 1202, in one or more of the various embodiments, a visualization engine, file system engine, or monitoring engine may be arranged to determine one or more metric values for one or more file system characteristics. In one or more of the various embodiments, metrics may be related to various activity that may be directly or indirectly associated with the file system. In one or more of the various embodiments, one or more metrics may be based on one or more aggregations or various measurements, signals, events, or the like, that may be associated with a file system. Also, in some embodiments, one or more metrics may be based real-time or near real-time measurements, signals, events, or the like.

In one or more of the various embodiments, metrics may be derived from one or more other metrics. For example, in some embodiments, a primary metric may be arranged to accumulate the number of client connections over the lifetime of the file system, while a derived metric may represent the change in connections over a specified time period.

In one or more of the various embodiments, one or more metrics may be measured directly by the file system engine, visualization engine, or monitoring engine while one or more other metrics may be measured by one or more external or third party services or processes.

At block 1204, in one or more of the various embodiments, optionally, the visualization engine may be arranged to fit the one or more metric values to a distribution curve. In one or more of the various embodiments, visualization engines may be arranged to determine a type of distribution, such as, normal distributions, or the like, that may best match the collected metrics. Accordingly, in some embodiments, visualization engines may be arranged to apply one or more goodness of fit functions to the collected metrics to determine a distribution that best fits the collected metrics. In some embodiments, visualization engines may be arranged to employ rules, instructions, or the like, provided via configuration information to determine the available distributions or goodness of fit functions.

Note, this block is optional because in some embodiments the collected metric values may be assumed to be a normal distribution, or the like.

At block 1206, in one or more of the various embodiments, the visualization engine may be arranged to determine an upper percentile value based on the metric values and the distribution. In one or more of the various embodiments, visualization engines may be arranged to execute one or more functions to determine a value that may represent a upper percentile of the distribution of metrics values. In some embodiments, the upper percentile may be a constant, such as 0.9 (90%). In other embodiments, the upper percentile value may be computed based on the distribution of metric values. Also, in some embodiments, the determination of the upper percentile may vary depending on the type of metric being evaluated. Accordingly, in some embodiments, configuration information may be employed to associated upper percentile values or functions for computing upper percentile values with one or more metric types.

At block 1208, in one or more of the various embodiments, the visualization engine may be arranged to determine a lower percentile value based on the one or more metric values and the distribution. In some embodiments, similar to determining upper percentile values as described above, visualization engines may be arranged to determine a lower percentile value for the distribution of metric values.

At block 1210, in one or more of the various embodiments, the visualization engine may be arranged to generate one or more visualizations based on the upper percentile value and the lower percentile value. In one or more of the various embodiments, visualization engines may be arranged to generate a visualization of the distribution of metrics that includes the metric values in the upper percentile of the distribution of metrics and the metric value in the lower percentile of the distribution of metrics. In some embodiments, the remaining 'middle' values of the metric distribution may be omitted from the visualization. Accordingly, in some embodiments, the visualization may provide visual information associated with the outlier values of the metrics. Thus, in some embodiments, a user viewing the visualization may easily observe the outlier metric values without them being hidden or obscured by normal metric values.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrative Use Case

FIGS. 13-20 illustrates a non-limiting examples of display panels that may be included user interfaces for managing distributed file systems in accordance with at least one of the various embodiments. One of ordinary skill in the art will appreciate that other display panels may be included in user interfaces without departing from the scope of the innovations described herein. Further, the below described display panels are sufficient of ordinary skill in the art to understand and practice the innovations described herein.

Figure 13:
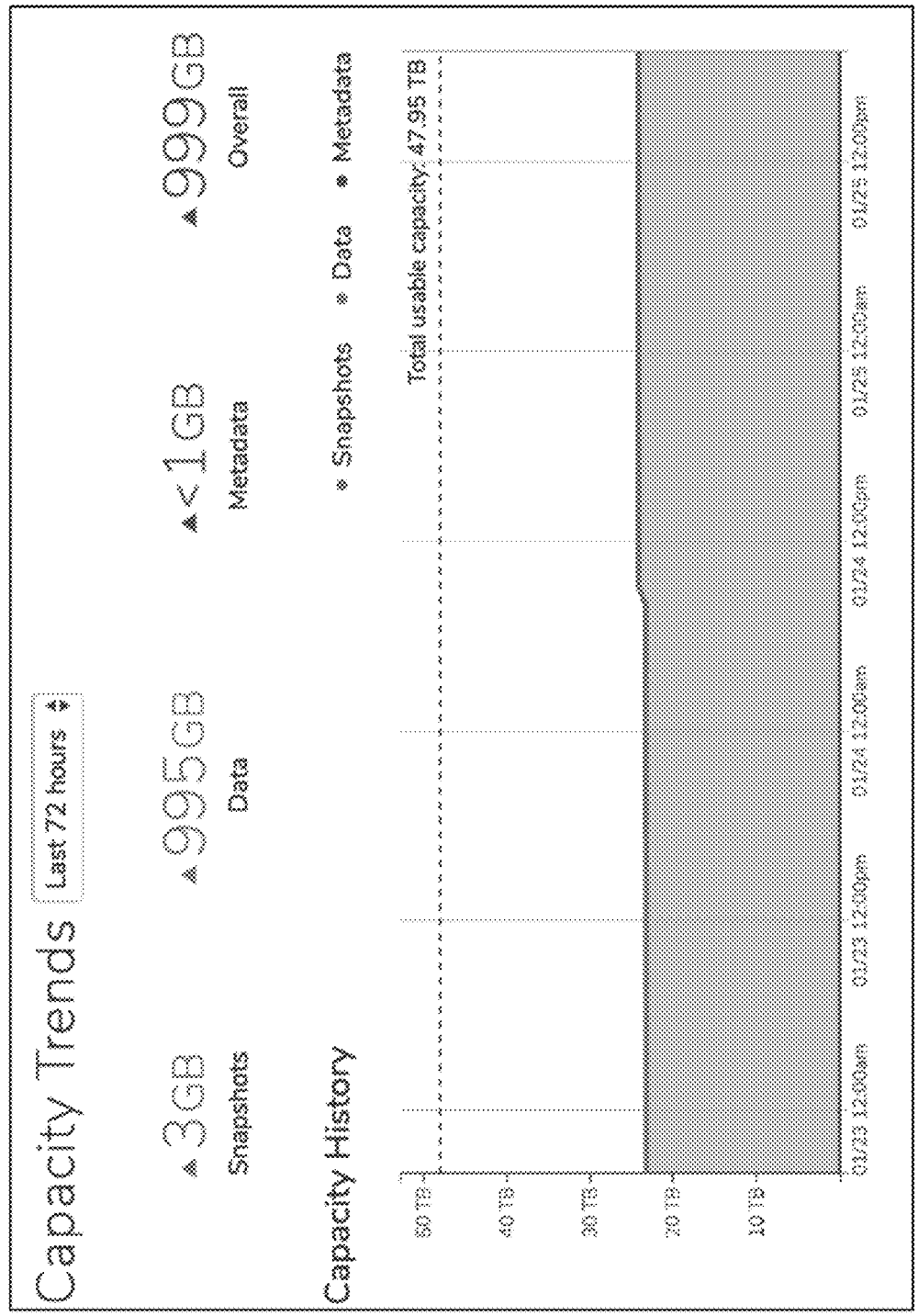
FIG. 13 illustrates a logical schematic of a panel for showing capacity trends over time for distributed file systems in accordance with one or more of the various embodiments.

FIG. 13 illustrates a logical schematic of panel 1300 for showing capacity trends over time for distributed file systems in accordance with one or more of the various embodiments. In this example, panel 1300 includes a visualization the represents the capacity trends of a file system over a specified time window. In this example, for some embodiments, panel 1300 includes one or more user interface controls for modifying the time window. Further, in some embodiments, additional summary information may be included in the panel, the reports capacity information for one or more categories of data in the file system. In this example, the category summaries improve the ability of user to determine how much of the capacity may be allocated to administrative or operational use (e.g., snapshots, meta-data, or the like) as compared to user data.

Figure 14:
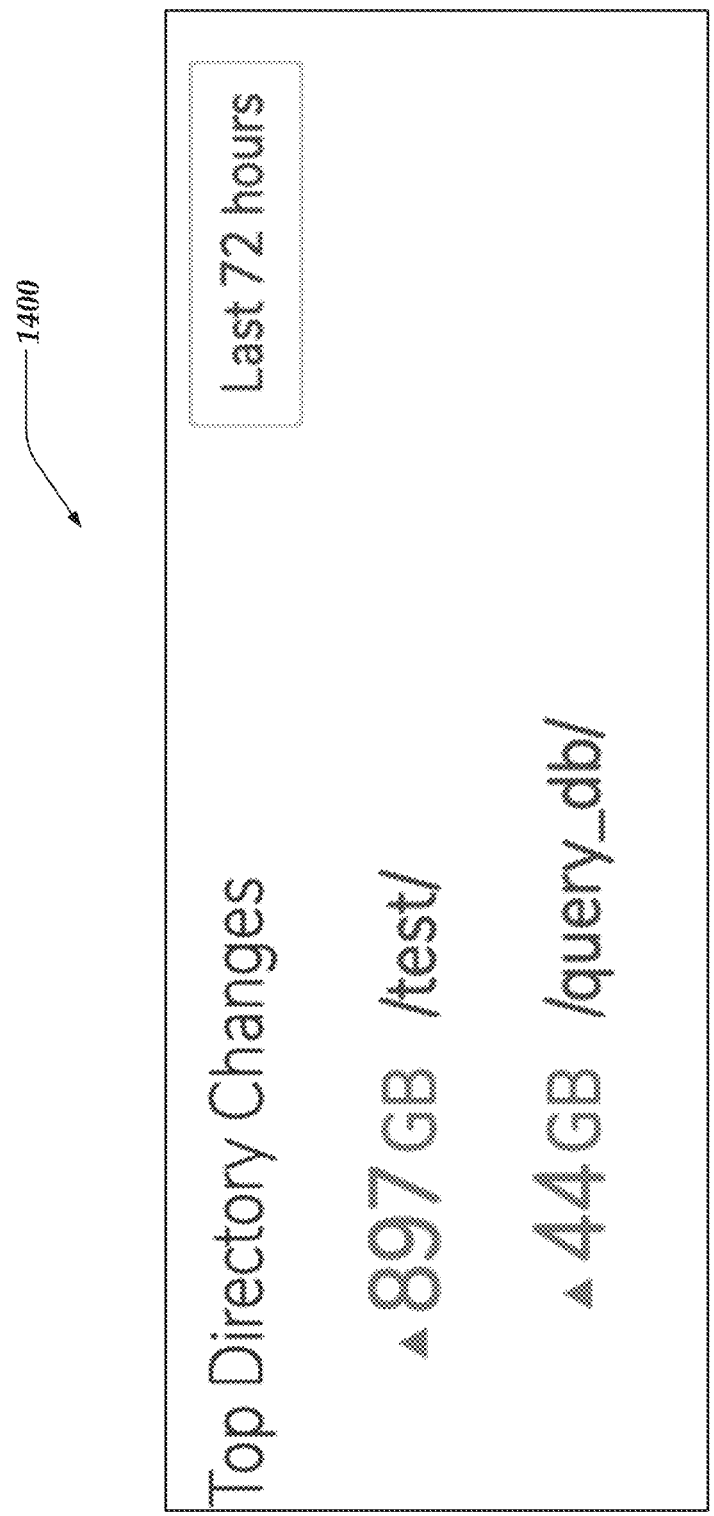
FIG. 14 illustrates a logical schematic of a panel for top directory changes for distributed file systems in accordance with one or more of the various embodiments.

FIG. 14 illustrates a logical schematic of panel 1400 for top directory changes for distributed file systems in accordance with one or more of the various embodiments. In this example, panel 1400 includes a shows one or more directories in a file system that have the highest capacity changes for a given time window. In some embodiments, visualization engines may be arranged to determine the number of top changed directories to show based on configuration information. In this example, for some embodiments, panel 1400 includes one or more user interface controls for modifying the time window.

Figure 15:
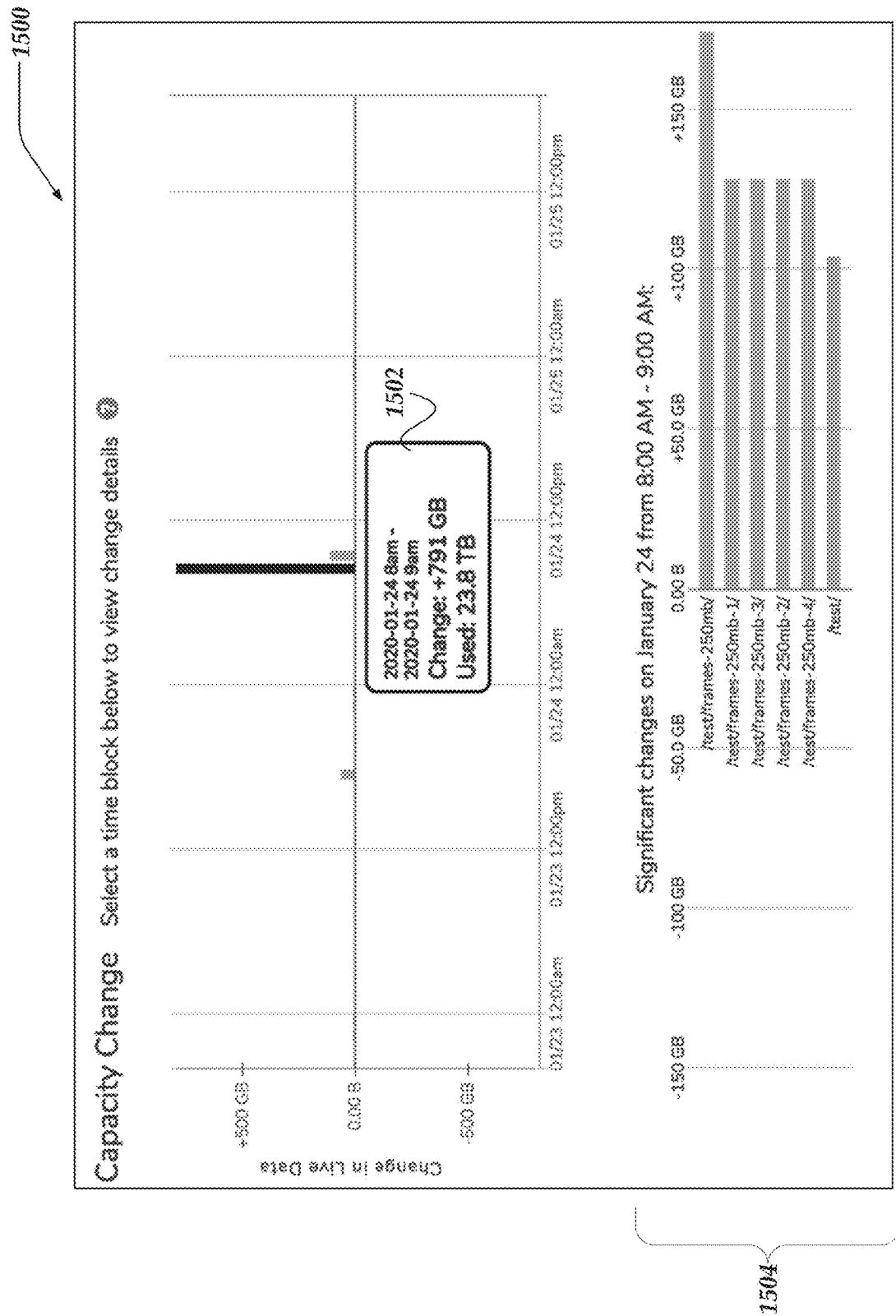
FIG. 15 illustrates a logical schematic of a panel for drilling down into the details of capacity change information for distributed file systems in accordance with one or more of the various embodiments.

FIG. 15 illustrates a logical schematic of panel 1500 for drilling down into the details of capacity change information for distributed file systems in accordance with one or more of the various embodiments. In this example, popup panel 1502 may be displayed as a user clicks or hovers over summary information displayed in the panel. In this example, popup panel 1502 shows a brief summary of the relevant changes for the time period. This may improve a user's immediate understanding of the context associated with the mark of interest. Also, in this example, in some embodiments, panel portion 1504 may be arranged to show expanded information that may be associated with the activity associated with the time window corresponding popup panel 1502. Accordingly, in some embodiments, users may simultaneously be provided context information and the supporting detail without having to navigate to another panel or user interface.

Figure 16:
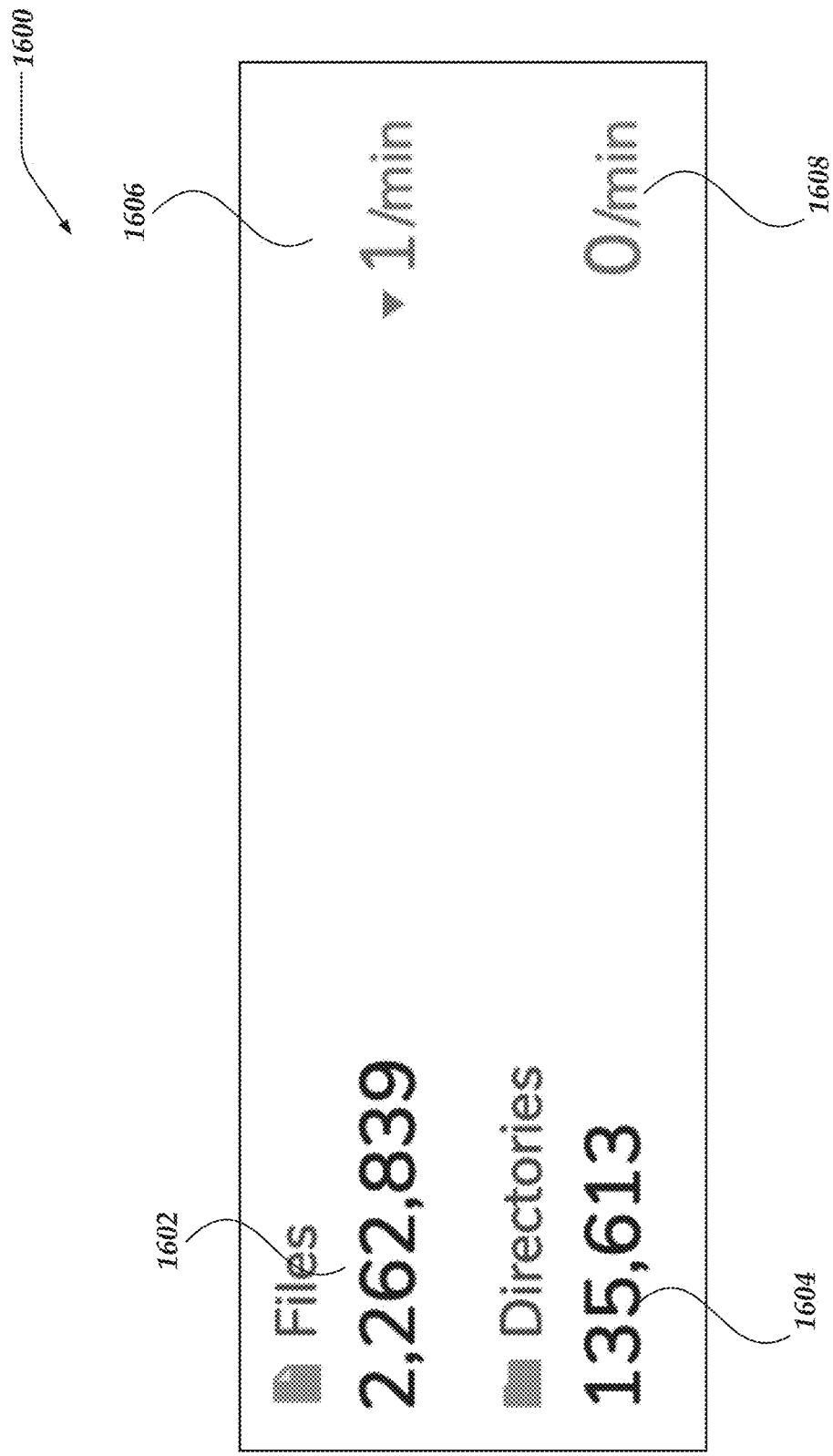
FIG. 16 illustrates a logical schematic of a panel for file object count information for distributed file systems in accordance with one or more of the various embodiments.

FIG. 16 illustrates a logical schematic of panel 1600 for file object count information for distributed file systems in accordance with one or more of the various embodiments. In this example, panel 1600 shows a current file count 1602 and directory count 1604 for a file system. Further, in some embodiments, rate-of-change information, such as, file count change 1606 and directory count change 1608, or the like, may be included for each file object type, providing additional context to the user. Accordingly, in some embodiments, while static count information may be of some value to a user trying to evaluate a file system, absent rate-of-change information, object count may be of limited utility. For example, in some embodiments, an object count that is high but unchanging may be little concerned compared to an object count that is high but increasing. Thus, in some embodiments, including current values and rate-of-change values in the same visualization may improve a user's ability to understand the state of the file system.

Figure 17:
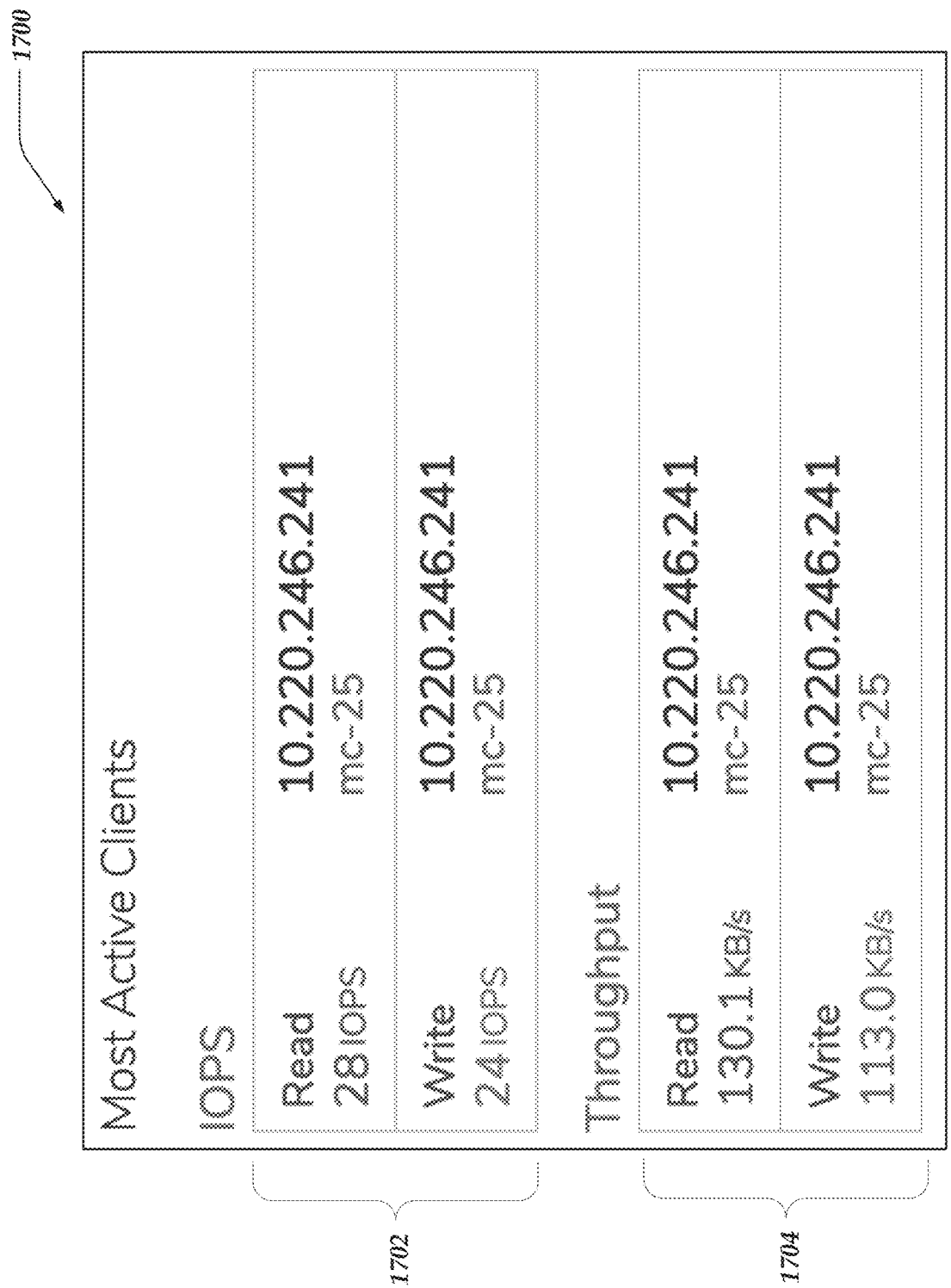
FIG. 17 illustrates a logical schematic of a panel for displaying information about the most active clients in distributed file systems in accordance with one or more of the various embodiments.

FIG. 17 illustrates a logical schematic of panel 1700 for displaying information about the most active clients in distributed file systems in accordance with one or more of the various embodiments. As described above, file system engines, monitoring engines, or the like, may be arranged to monitor various metrics associated with file system operations or file system clients. Accordingly, in some embodiments, visualization engines may be arranged to generate or display one or more panels, such as, panel 1700 the shows some or all of the monitored metrics. In this example, panel 1700 shows information about metrics associated with clients of a file system. In this example, section 1702 shows which clients have the most Input/Output operations per second. In this example, a network address and host name may be shown along with the values of the metric of interest. Similarly, in this example, section 1704 shows the information about the clients that have the highest throughput in in the file system. In some embodiments, additional or other metrics may be highlighted. In some case, visualization engine may be arranged to automatic rotated or cycle through information for more metrics than can fit on the panel at one time.

Figure 18:
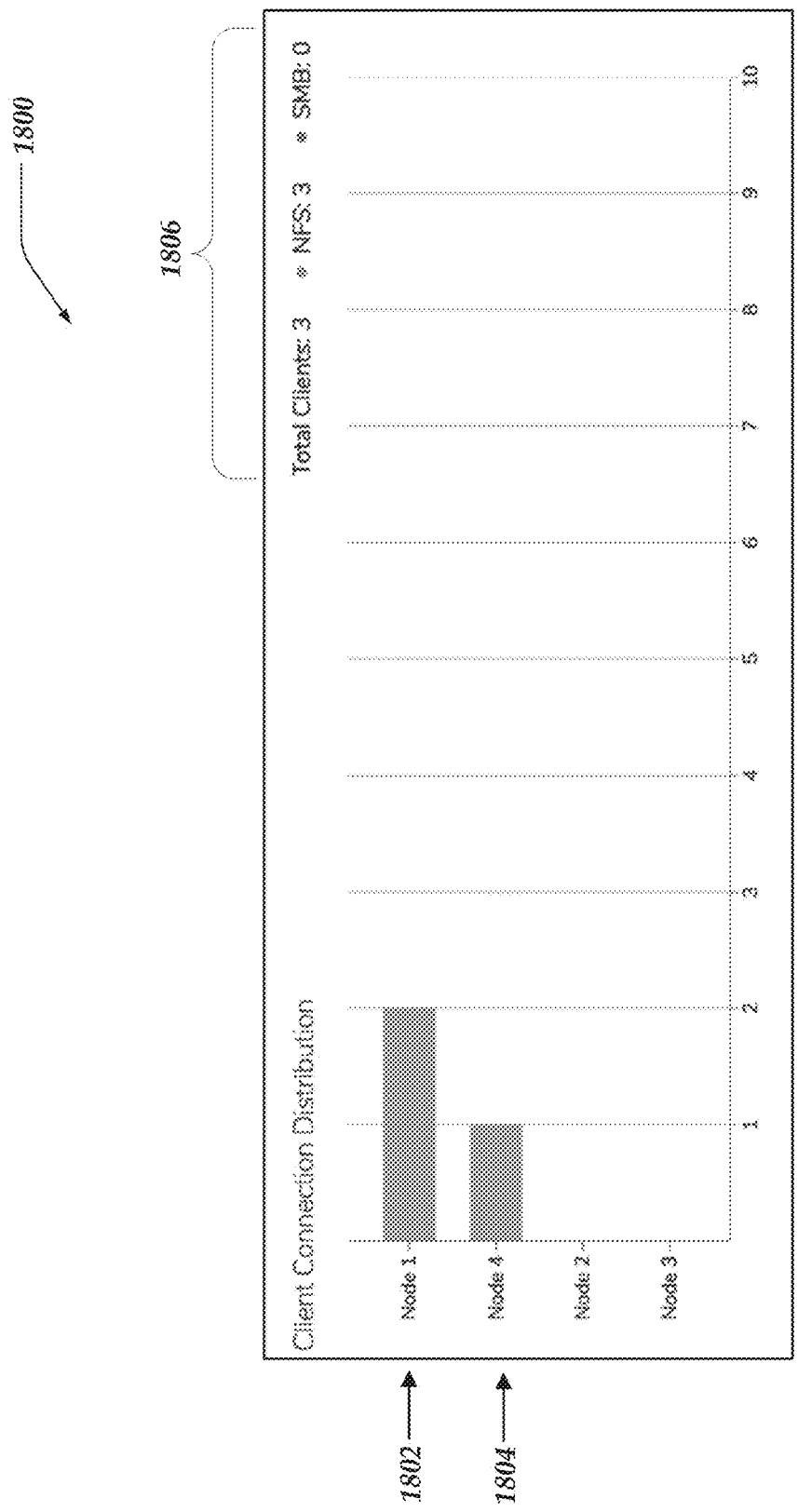
FIG. 18 illustrates a logical schematic of a panel for the distribution of connections in distributed file systems in accordance with one or more of the various embodiments.

FIG. 18 illustrates a logical schematic of panel 1800 for the distribution of connections in distributed file systems in accordance with one or more of the various embodiments. In this example, panel 1800 may be arranged to show how the number of connections with a file system may be distributed or balanced across the individual nodes in distributed file system that may include multiple nodes. In this example, a comparison of mark 1802 to mark 1804 enables a user to observe that the connection count for node 1 is more than node 2. Further, in this example, legend 1806 includes color codes or patterns that may convey the type of communication or application protocols that may be associated with the connections. In this example, in the absence of a color illustration, it may be assumed that the legend color for NFS may correspond to the colors employed in this example, for mark 1802 and mark 1804.

Figure 19:
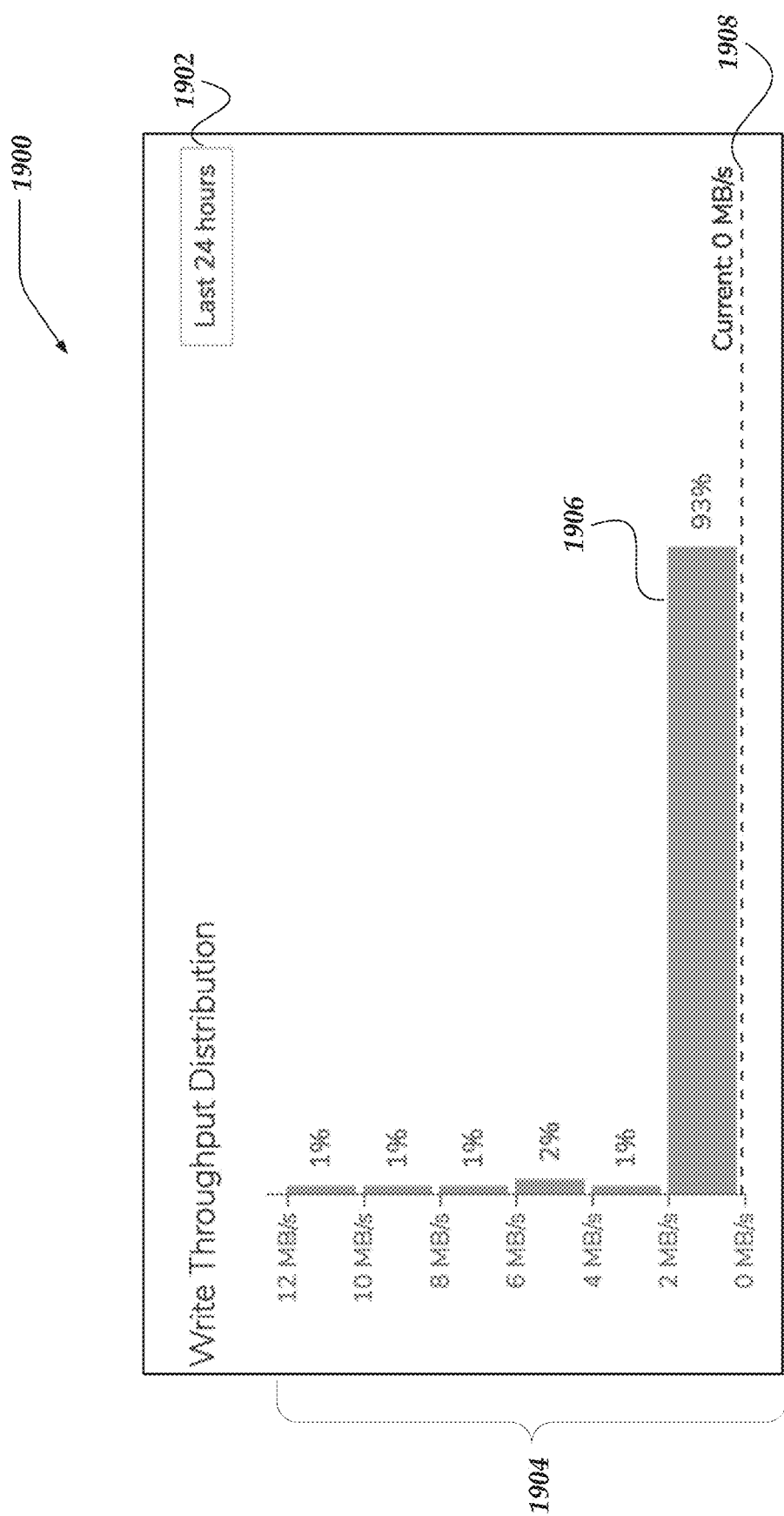
FIG. 19 illustrates a logical schematic of a panel for write throughput distribution in distributed file systems in accordance with one or more of the various embodiments.

FIG. 19 illustrates a logical schematic of panel 1900 for write throughput distribution in distributed file systems in accordance with one or more of the various embodiments. In this example, panel 1900 represents a compound visualization comprised of aggregate or average metric values for a time window and current value for the same metric. In this example, user interface 1902 may enable users to select a time window of interest, in this example, the time window is 24 hours. Also, in some embodiments, the vertical axis marks 1904 show how various write throughput values may be distributed. In this example, mark 1906 shows that the bulk write through rates in the time windows are between 0 MB/s and 2 MB/s. And, in this example, mark 1908 shows a current write throughput rate for the file system. Accordingly, in some embodiments, compound visualizations, such as shown in panel 1900, may improve a user's ability to gain insight into the operation of the file system by including aggregate/average metric values and current values in the same panel.

What is claimed as new and desired to be protected by Letters Patent of the United States is:

1. A method for managing data in a file system over a network using one or more processors that execute instructions that are configured to cause performance of actions, comprising:
    providing the file system that includes a plurality of objects;
    providing a capacity value of the file system based on a storage size value of the plurality of objects;
    determining a threshold value based on the capacity value and a metric partition count;
    employing one or more traversals of the file system to determine a set of one or more metric partitions having a cardinality equivalent to the metric partition count, wherein each metric partition is associated with one or more objects, and wherein each metric partition is associated with a local storage size value that is equivalent to the threshold value;
    monitoring one or more metrics associated with one or more activities that are associated with the file system;
    determining one or more metric partition values based on one or more metric values associated with the one or more metric partitions, wherein each metric partition value is based on a portion of the one or more metric values associated with a portion of the one or more activities that are associated with a corresponding metric partition, and wherein the one or more metric partition values are aggregated for each metric partition that is a member of the set of metric partitions;
    determining one of a plurality of types of distributions that fit with the one or more metric values based on one or more rules included with configuration information, wherein an upper percentile value and a lower percentile value is determined for the type of distribution; and
    generating one or more visualizations for the set of metric partitions based on the type of distribution that is associated with the determined upper percentile value and the determined lower percentile value and the aggregation of the one or more metric partition values for each of the set of metric partitions and the configuration information that includes one or more of local circumstances or local requirements for a user, wherein the one or more visualizations are displayed on a hardware display to the user, and wherein one or more of a particular aggregation of the one or more metric partition values, a metric partition fraction, or a count of aggregates for a file system is maintained to provide an immediate response to a query of the one or more visualizations in regard to the one or more of local circumstances or local requirements for the user, and wherein the one or more visualizations are updated based on one or more real time updates to the one or more metric values.

2. The method of claim 1, further comprising:
    determining a real-time value of a metric for the file system;
    generating another visualization that represents the real-time value; and
    displaying the one or more visualizations and the other visualization in a same panel, wherein the other visualization is overlaid on the one or more visualizations, and wherein each visualization in the panel is visible at the same time.

3. The method of claim 1, further comprising:
    determining a distribution of values associated with the one or more metrics associated with the file system;
    determining a first portion of the values in the distribution that are above an upper percentile value;
    determining a second portion of the values in the distribution that are below a lower percentile value; and
    generating a visualization that includes one or more visual representations of the first portion of values and the second portion of values, wherein a remaining portion of the values in the distribution are omitted from the visualization.

4. The method of claim 1, further comprising:
    generating one or more legend visualizations for one or more visualizations, wherein each legend visualization is associated with a type of mark in the one or more visualizations; and
    displaying a summary value for a metric value associated with the type of mark within the boundary of the one or more legend visualizations.

5. The method of claim 1, further comprising:
    determining one or more other metric partition values based on the one or more metric values and the one or more metric partitions, wherein the one or more other metric partition values are determined subsequent to the one or more metric partition values; and
    generating a visualization based on a difference between the one or more other metric partition values and the one or more metric partition values.

6. A system for managing data in a file system over a network, comprising:

a network computer device, comprising:
a memory operative to store at least instructions; and
one or more processors operative to execute the instructions, wherein execution of the instructions causes performance of actions, including:
instantiating a file system management server application that is operative to perform actions, comprising:
providing the file system that includes a plurality of objects;
providing a capacity value of the file system based on a storage size value of the plurality of objects;
determining a threshold value based on the capacity value and a metric partition count;
employing one or more traversals of the file system to determine a set of one or more metric partitions having a cardinality equivalent to the metric partition count, wherein each metric partition is associated with one or more objects, and wherein each metric partition is associated with a local storage size value that is equivalent to the threshold value;
monitoring one or more metrics associated with one or more activities that are associated with the file system;
determining one or more metric partition values based on one or more metric values associated with the set of metric partitions, wherein each metric partition value is based on a portion of the one or more metric values associated with a portion of the one or more activities that are associated with a corresponding metric partition, and wherein the one or more metric partition values are aggregated for each metric partition that is a member of the set of metric partitions;
determining one of a plurality of types of distributions that fit with the one or more metric values based on one or more rules included with configuration information, wherein an upper percentile value and a lower percentile value is determined for the type of distribution; and
generating one or more visualizations for the set of metric partitions based on the type of distribution that is associated with the determined upper percentile value and the determined lower percentile value and the aggregation of the one or more metric partition values for each of the set of metric partitions and the configuration information that includes one or more of local circumstances or local requirements for a user, wherein the one or more visualizations are displayed on a hardware display to the user, and wherein one or more of a particular aggregation of the one or more metric partition values, a metric partition fraction, or a count of aggregates for a file system is maintained to provide an immediate response to a query of the one or more visualizations in regard to the one or more of local circumstances or local requirements for the user, and wherein the one or more visualizations are updated based on one or more real time updates to the one or more metric values; and
a client computer device, comprising:
a memory operative to store at least instructions; and
one or more processors operative to execute the instructions that are configured to cause actions, wherein execution of the instructions causes performance of the actions, including:
displaying the one or more visualizations on a display to the user.

7. The system of claim 6, wherein the file system management server application performs further actions, further comprising:
determining a real-time value of a metric for the file system;
generating another visualization that represents the real-time value; and
displaying the one or more visualizations and the other visualization in a same panel, wherein the other visualization is overlaid on the one or more visualizations, and wherein each visualization in the panel is visible at the same time.

8. The system of claim 6, wherein the file system management server application performs further actions, further comprising:
determining a distribution of values associated with the one or more metrics associated with the file system;
determining a first portion of the values in the distribution that are above an upper percentile value;
determining a second portion of the values in the distribution that are below a lower percentile value; and
generating a visualization that includes one or more visual representations of the first portion of values and the second portion of values, wherein a remaining portion of the values in the distribution are omitted from the visualization.

9. The system of claim 6, wherein the file system management server application performs further actions, further comprising:
generating one or more legend visualizations for one or more visualizations, wherein each legend visualization is associated with a type of mark in the one or more visualizations; and
displaying a summary value for a metric value associated with the type of mark within the boundary of the one or more legend visualizations.

10. The system of claim 6, wherein the file system management server application performs further actions, further comprising:
determining one or more other metric partition values based on the one or more metric values and the one or more metric partitions, wherein the one or more other metric partition values are determined subsequent to the one or more metric partition values; and
generating a visualization based on a difference between the one or more other metric partition values and the one or more metric partition values.

11. A processor readable non-transitory storage media that includes instructions for managing data in a file system over a network, wherein execution of the instructions that are configured to cause actions, by one or more processors, on one or more network computers causes performance of the actions, comprising:
providing the file system that includes a plurality of objects;
providing a capacity value of the file system based on a storage size value of the plurality of objects;
determining a threshold value based on the capacity value and a metric partition count;
employing one or more traversals of the file system to determine a set of one or more metric partitions having a cardinality equivalent to the metric partition count, wherein each metric partition is associated with one or more objects, and wherein each metric partition is associated with a local storage size value that is equivalent to the threshold value;

monitoring one or more metrics associated with one or more activities that are associated with the file system;

determining one or more metric partition values based on one or more metric values associated with the one or more metric partitions, wherein each metric partition value is based on a portion of the one or more metric values associated with a portion of the one or more activities that are associated with a corresponding metric partition, and wherein the one or more metric partition values are aggregated for each metric partition that is a member of the set of metric partitions;

determining one of a plurality of types of distributions that fit with the one or more metric values based on one or more rules included with configuration information, wherein an upper percentile value and a lower percentile value is determined for the type of distribution; and generating one or more visualizations for the set of metric partitions based on the type of distribution that is associated with the determined upper percentile value and the determined lower percentile value and the aggregation of the one or more metric partition values for each of the set of metric partitions and the configuration information that includes one or more of local circumstances or local requirements for a user, wherein the one or more visualizations are displayed on a hardware display to the user, and wherein one or more of a particular aggregation of the one or more metric partition values, a metric partition fraction, or a count of aggregates for a file system is maintained to provide an immediate response to a query of the one or more visualizations in regard to the one or more of local circumstances or local requirements for the user, and wherein the one or more visualizations are updated based on one or more real time updates to the one or more metric values.

12. The media of claim 11, further comprising:
determining a real-time value of a metric for the file system;
generating another visualization that represents the real-time value; and
displaying the one or more visualizations and the other visualization in a same panel, wherein the other visualization is overlaid on the one or more visualizations, and wherein each visualization in the panel is visible at the same time.

13. The media of claim 11, further comprising:
determining a distribution of values associated with the one or more metrics associated with the file system;
determining a first portion of the values in the distribution that are above an upper percentile value;
determining a second portion of the values in the distribution that are below a lower percentile value; and
generating a visualization that includes one or more visual representations of the first portion of values and the second portion of values, wherein a remaining portion of the values in the distribution are omitted from the visualization.

14. The media of claim 11, further comprising:
generating one or more legend visualizations for one or more visualizations, wherein each legend visualization is associated with a type of mark in the one or more visualizations; and displaying a summary value for a metric value associated with the type of mark within the boundary of the one or more legend visualizations.

15. The media of claim 11, further comprising:
determining one or more other metric partition values based on the one or more metric values and the one or more metric partitions, wherein the one or more other metric partition values are determined subsequent to the one or more metric partition values; and
generating a visualization based on a difference between the one or more other metric partition values and the one or more metric partition values.

16. A network computer for managing data in a file system over a network, comprising:
a memory that is operative to store at least instructions; and
one or more processors operative to execute the instructions that are configured to cause actions, wherein the execution of the instructions causes performance of the actions, including:
instantiating a file system management server application that is operative to perform actions, comprising:
providing the file system that includes a plurality of objects;
providing a capacity value of the file system based on a storage size value of the plurality of objects;
determining a threshold value based on the capacity value and a metric partition count;
employing one or more traversals of the file system to determine a set of one or more metric partitions having a cardinality equivalent to the metric partition count, wherein each metric partition is associated with one or more objects, and wherein each metric partition is associated with a local storage size value that is equivalent to the threshold value;
monitoring one or more metrics associated with one or more activities that are associated with the file system;
determining one of a plurality of types of distributions that fit with the one or more metric values based on one or more rules included with configuration information, wherein an upper percentile value and a lower percentile value is determined for the type of distribution; and
generating one or more visualizations for the set of metric partitions based on the type of distribution that is associated with the determined upper percentile value and the determined lower percentile value and the aggregation of the one or more metric partition values for each of the set of metric partitions and the configuration information that includes one or more of local circumstances or local requirements for a user, wherein the one or more visualizations are displayed on a hardware display to the user, and wherein one or more of a particular aggregation of the one or more metric partition values, a metric partition fraction, or a count of aggregates for a file system is maintained to provide an immediate response to a query of the one or more visualizations in regard to the one or more of local circumstances or local requirements for the user, and wherein the one or more visualizations are updated based on one or more real time updates to the one or more metric values.

17. The network computer of claim 16, wherein the one or more processors execute instructions that perform further actions, further comprising:

determining a real-time value of a metric for the file system;

generating another visualization that represents the real-time value; and displaying the one or more visualizations and the other visualization in a same panel, wherein the other visualization is overlaid on the one or more visualizations, and wherein each visualization in the panel is visible at the same time.

18. The network computer of claim 16, wherein the one or more processors execute instructions that perform further actions, further comprising:

determining a distribution of values associated with the one or more metrics associated with the file system;

determining a first portion of the values in the distribution that are above an upper percentile value;

determining a second portion of the values in the distribution that are below a lower percentile value; and generating a visualization that includes one or more visual representations of the first portion of values and the second portion of values, wherein a remaining portion of the values in the distribution are omitted from the visualization.

19. The network computer of claim 16, wherein the one or more processors execute instructions that perform further actions, further comprising:

generating one or more legend visualizations for one or more visualizations, wherein each legend visualization is associated with a type of mark in the one or more visualizations; and displaying a summary value for a metric value associated with the type of mark within the boundary of the one or more legend visualizations.

20. The network computer of claim 16, wherein the one or more processors execute instructions that perform further actions, further comprising:

determining one or more other metric partition values based on the one or more metric values and the one or more metric partitions, wherein the one or more other metric partition values are determined subsequent to the one or more metric partition values; and generating a visualization based on a difference between the one or more other metric partition values and the one or more metric partition values.

* * * * *